US012718507B2

(12) United States Patent
Goldberg et al.

(10) Patent No.: US 12,718,507 B2
(45) Date of Patent: Aug. 25, 2026

(54) SYSTEMS AND METHODS FOR SMART PLACEMENT OF VIRTUAL OBJECTS

(71) Applicant: Apple Inc., Cupertino, CA (US)

(72) Inventors: Brian E. Goldberg, Raleigh, NC (US); Blade E. Chapman, Cary, NC (US); Ken T. Loh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 18/507,771

(22) Filed: Nov. 13, 2023

(65) Prior Publication Data

US 2024/0242457 A1 Jul. 18, 2024

Related U.S. Application Data

(60) Provisional application No. 63/479,979, filed on Jan. 13, 2023.

(51) Int. Cl.
*G06T 19/20* (2011.01)
*G06T 7/70* (2017.01)

(52) U.S. Cl.
CPC ................ *G06T 19/20* (2013.01); *G06T 7/70* (2017.01); *G06T 2200/24* (2013.01);
(Continued)

(58) Field of Classification Search
CPC ....... G06Q 30/0643; G06T 19/20; G06T 7/70; G06T 2200/24; G06T 2207/20081;
(Continued)

(56) References Cited

U.S. PATENT DOCUMENTS

| | | |
|---|---|---|
| 9,129,404 B1 | 9/2015 | Wagner |
| 9,965,800 B1 | 5/2018 | Pitstick et al. |

(Continued)

FOREIGN PATENT DOCUMENTS

| | | |
|---|---|---|
| CN | 111316334 A | 6/2020 |
| CN | 111488056 A | 8/2020 |

OTHER PUBLICATIONS

Final Office Action received for U.S. Appl. No. 17/654,391, mailed on May 21, 2024, 71 pages.

(Continued)

*Primary Examiner* — Daniel Samwel
(74) *Attorney, Agent, or Firm* — Kubota & Basol LLP

(57) ABSTRACT

In some aspects, an electronic device displays virtual objects in a three-dimensional extended reality ("XR") environment with automatically determined location(s) and/or orientation(s). In some aspects, the electronic device receives an input corresponding to a request to display the virtual objects in the XR environment. In some aspects, in response to the input, the electronic device displays the virtual objects in the XR environment. In some aspects, the electronic device compares characteristics of a physical environment of the electronic device with characteristics of the at least the subset of the collection of the virtual objects, including determining first locations of walls of the physical environment relative to at least one of a second location of the user interface of the first application or a third location of a user of the electronic device, to determine the location(s) and orientation(s) at which to display the virtual object(s).

19 Claims, 14 Drawing Sheets

(52) U.S. Cl.
CPC ............... *G06T 2207/20081* (2013.01); *G06T 2207/20092* (2013.01); *G06T 2210/04* (2013.01); *G06T 2219/2004* (2013.01)

(58) Field of Classification Search
CPC ....... G06T 2207/20092; G06T 2210/04; G06T 2219/2004
See application file for complete search history.

(56) References Cited

U.S. PATENT DOCUMENTS

| | | | | |
|---|---|---|---|---|
| 10,134,084 | B1 | 11/2018 | Gabriele et al. | |
| 10,181,218 | B1 * | 1/2019 | Goetzinger, Jr. | G06F 3/0486 |
| 10,318,569 | B1 | 6/2019 | Funk et al. | |
| 10,600,255 | B2 | 3/2020 | Besecker et al. | |
| 10,627,625 | B2 | 4/2020 | Hoover et al. | |
| 10,726,469 | B1 | 7/2020 | Otwell et al. | |
| 10,848,335 | B1 | 11/2020 | Roche | |
| 11,126,845 | B1 * | 9/2021 | Chaturvedi | G06N 3/0464 |
| 11,182,865 | B1 | 11/2021 | Catalano | |
| 11,200,519 | B1 * | 12/2021 | Roa | G06Q 10/0631 |
| 11,250,642 | B1 | 2/2022 | Gordon et al. | |
| 11,367,250 | B2 | 6/2022 | Totty et al. | |
| 11,604,559 | B2 | 3/2023 | Chaudhri et al. | |
| 2005/0081161 | A1 * | 4/2005 | MacInnes | G06Q 10/103 715/848 |
| 2007/0282695 | A1 | 12/2007 | Toper et al. | |
| 2008/0071559 | A1 | 3/2008 | Arrasvuori | |
| 2010/0214284 | A1 * | 8/2010 | Rieffel | G06T 17/00 382/154 |
| 2014/0282220 | A1 | 9/2014 | Wantland et al. | |
| 2015/0066712 | A1 | 3/2015 | Altieri | |
| 2015/0324897 | A1 | 11/2015 | Venters et al. | |
| 2016/0307263 | A1 | 10/2016 | Fletcher et al. | |
| 2018/0040044 | A1 | 2/2018 | Mattingly et al. | |
| 2018/0350145 | A1 | 12/2018 | Byl et al. | |
| 2019/0107990 | A1 | 4/2019 | Spivack et al. | |
| 2019/0251753 | A1 * | 8/2019 | Canada | G06T 11/60 |
| 2020/0320792 | A1 | 10/2020 | Sadalgi et al. | |
| 2021/0019946 | A1 | 1/2021 | Sonasath et al. | |
| 2021/0133850 | A1 | 5/2021 | Ayush et al. | |
| 2021/0209261 | A1 * | 7/2021 | Reynolds | G06F 30/27 |
| 2022/0058883 | A1 * | 2/2022 | Yan | G06T 19/006 |
| 2022/0317859 | A1 * | 10/2022 | Jagannathan | H04L 65/403 |
| 2022/0318876 | A1 | 10/2022 | Loh et al. | |

OTHER PUBLICATIONS

Advisory Action received for U.S. Appl. No. 17/654,391, mailed on Oct. 18, 2024, 3 pages.

Examiner's Answer to Appeal Brief received for U.S. Appl. No. 17/654,391, mailed on Feb. 14, 2025, 44 pages.

Search Report received for Chinese Patent Application No. 202210330747.8, mailed on Nov. 23, 2024, 4 pages (2 pages of English Translation and 2 pages of Official Copy).

Milberg, Sandra, "Should Leading Brand Manufacturers Supply Private Label Brands to Retailers: Calibrating the Trade-Off", Industrial Marketing Management, Sep. 1, 2018,.

Restriction Requirement received for U.S. Appl. No. 17/812,427, mailed on Apr. 12, 2024, 12 pages.

A Product Configurator for Complex Products, Configure One, Available online at: <https://www.configureone.com/product-configurator/>, retrieved on Jun. 10, 2022, 9 pages.

Configure One, CPQ (configure, price, & quote) software, Available online at: <https://www.configureone.com/>, retrieved on Jun. 10, 2022, 9 pages.

Kbmax, EPICOR CPQ, Available online at: <https://www.epicor.com/en-us/industry-productivity-solutions/modules/sales-and-marketing/cpq/cpq-for-b2b-ecommerce/>, retrieved on Jun. 10, 2022, 7 pages.

Non-Final Office Action received for U.S. Appl. No. 17/654,391, mailed on Sep. 12, 2023, 52 pages.

Threekit, Available online at: <https://www.threekit.com/platform-overview#solution>, retrieved on Jun. 10, 2022, 20 pages.

Axonom Inc., "Powertrak 3D Product Configurator", Available online at: <https://www.axonom.com/3d-product-configurator>, retrieved on Jun. 10, 2022, 10 pages.

Axonom Inc., "Powertrak Software", Available online at: <https://www.axonom.com/powertrak>, retrieved on Jun. 10, 2022, 7 pages.

Powertrak CPQ Reviews & Product Details, Available online at: < https://www.g2.com/products/powertrak-cpq/reviews#survey-response-4241961>, retrieved on Jun. 10, 2022, 25 pages.

Stuerzlinger et al., "Efficient Manipulation of Object Groups in Virtual Environments", Proceedings of the IEEE Virtual Reality 2002 (VR'02), 2002, 8 pages.

Tudjarov et al., "Web Virtual Reality For Product Customization", Advances in Production Engineering & Management, 2009, pp. 25-34.

Patent Board Decision received for U.S. Appl. No. 17/654,391, mailed on Feb. 10, 2026, 30 pages.

* cited by examiner

SYSTEMS AND METHODS FOR SMART PLACEMENT OF VIRTUAL OBJECTS

CROSS-REFERENCE TO RELATED APPLICATIONS

This application claims the benefit of U.S. Provisional Application No. 63/479,979, filed Jan. 13, 2023, the contents of which are incorporated herein by reference in their entirety for all purposes.

FIELD OF THE DISCLOSURE

This relates generally to the presentation of objects in computerized environments, and, more particularly, to the presentation of collections of objects with spatial arrangements automatically selected by a computer.

BACKGROUND OF THE DISCLOSURE

Online marketplaces can enable manufacturers and retailers to market goods to potential customers. Some online marketplaces can enable users to view virtual representations of marketable goods in augmented reality (AR), for example, illustrate to the user the actual size and/or scale of the marketable goods.

SUMMARY OF THE DISCLOSURE

This relates generally to the presentation of objects in computerized environments, and, more particularly, to the presentation of collections of objects with spatial arrangements automatically selected by a computer. In some aspects, an electronic device displays an extended reality (XR) environment including representations of real objects in the environment of the electronic device and/or representations of virtual objects. In some aspects, while displaying the XR environment, the electronic device receives an input corresponding to a request to add virtual objects to the XR environment. In response to receiving the input, the electronic device displays the virtual objects in the XR environment with location(s) and/or orientation(s) automatically selected based on characteristics of the XR environment and/or the virtual object(s). In some aspects, the electronic device places the virtual objects in the XR environment near a pair of adjacent walls that are selected from the plurality of walls in the XR environment based on proximity of the walls to the user, the location where the user is looking, and/or the user interface the virtual objects are from. In some aspects, the virtual objects in the XR environment are from different source(s) and/or brought into the XR environment from different application(s) and/or user interface(s).

The full descriptions of the aspects are provided in the Drawings and the Detailed Description, and it is understood that this Summary does not limit the scope of the disclosure in any way.

BRIEF DESCRIPTION OF THE DRAWINGS

For a better understanding of the various described aspects, reference should be made to the Detailed Description below, in conjunction with the following drawings in which like reference numerals often refer to corresponding parts throughout the figures.

DETAILED DESCRIPTION

Figure 1:
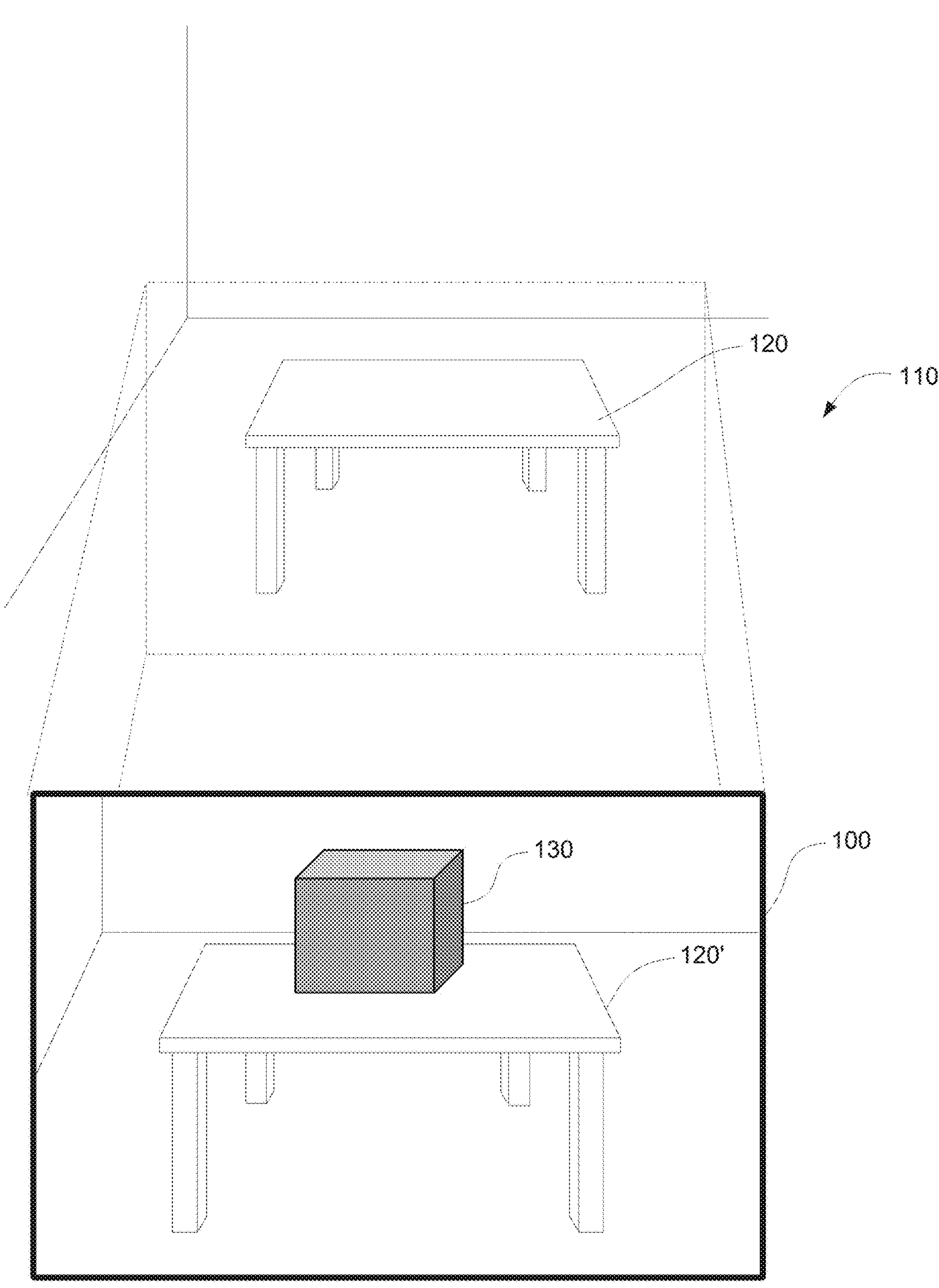
FIG. 1 illustrates an electronic device displaying XR content according to some aspects of the disclosure.

In the following description of aspects, reference is made to the accompanying drawings which form a part hereof, and in which it is shown by way of illustration specific aspects that are optionally practiced. It is to be understood that other aspects are optionally used, and structural changes are optionally made without departing from the scope of the disclosed aspects. Further, although the following description uses terms "first," "second," etc. to describe various elements, these elements should not be limited by the terms. These terms are only used to distinguish one element from another. For example, a first object or first file could be termed a second object or second file, and, similarly, a second object or second file could be termed a first object or first file, without departing from the scope of the various described aspects. The first object and the second object are both objects, but they are not the same object. Likewise, the first file and the second file are both files, but they are not the same file.

This relates generally to the presentation of objects in computerized environments, and, more particularly, to the presentation of collections of objects with spatial arrangements automatically selected by a computer. In some aspects, an electronic device displays an extended reality (XR) environment including representations of real objects in the environment of the electronic device and/or representations of virtual objects. In some aspects, while displaying the XR environment, the electronic device receives an input corresponding to a request to add virtual objects to the XR environment. In response to receiving the input, the electronic device displays the virtual objects in the XR environment with location(s) and/or orientation(s) automatically selected based on characteristics of the XR environment and/or the virtual object(s). In some aspects, the electronic device places the virtual objects in the XR environment near a pair of adjacent walls that are selected from the plurality of walls in the XR environment based on proximity of the walls to the user, the location where the user is looking, and/or the user interface the virtual objects are from. In some aspects, the virtual objects in the XR environment are from different source(s) and/or brought into the XR environment from different application(s) and/or user interface(s).

The terminology used in the description of the various described aspects herein is for the purpose of describing particular aspects only and is not intended to be limiting. As used in the description of the various described aspects and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In some aspects of a XR, a subset of a person's physical motions, or representations thereof, are tracked, and, in response, one or more characteristics of one or more virtual objects simulated in the XR environment are adjusted in a manner that comports with at least one law of physics. For example, a XR system may detect the device turning and/or moving and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). Examples of XR include virtual reality, mixed reality, and augmented reality.

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects. Examples of XR include virtual reality and mixed reality.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 illustrates an electronic device 100 displaying XR content according to some aspects of the disclosure. In some aspects, electronic device 100 is a hand-held or mobile device, such as a tablet computer, laptop computer or a smartphone. Examples of device 100 are described below with reference to FIG. 2. As shown in FIG. 1, electronic device 100 and table 120 are located in the physical environment 110. In some aspects, electronic device 100 may be configured to capture areas of physical environment 110 including table 120 (illustrated in the field of view of electronic device 100). In some aspects, in response to a trigger, the electronic device 100 may be configured to display a 3D XR object 130 (e.g., a cube illustrated in FIG. 1) positioned on top of a XR representation 120' of real-world table 120. For example, object 130 can be displayed on the surface of the table 120' in the XR environment displayed on device 100 in response to detecting the planar surface of table 120 in the physical environment 110. In some aspects, the electronic device 100 is able to display virtual objects on virtual surfaces of other virtual objects. For example, if table 120 were not in the physical environment 110 of the electronic device 100 and the electronic device 100 displayed virtual table 120' not based on physical table 120, the electronic device 100 could still display cube 130 on the surface of virtual table 120'. In some aspects, a user may desire to view a virtual object corresponding to a physical object available for purchase in a XR environment. The electronic device can display the virtual object based on a file that includes one or more attributes of the object with adjustable values. In some aspects, the file defines a source of the physical object corresponding to the virtual object and the electronic device is able to contact the source of the physical object corresponding to the virtual object to obtain real-time availability (e.g., for purchase) of the object with various configurations. In some aspects, the file includes metadata related to the virtual object, such as various options for displaying the virtual object in one of a plurality of available configurations. In some aspects, the electronic device 100 updates the metadata of the file in response to receiving updates from the source of the virtual objects. For example, the virtual object corresponds to an object available for sale and the source corresponds to a retailer and/or manufacturer of the object and provides updates to the electronic device 100 regarding which configurations of the object are currently available for purchase (e.g., in-stock and/or in production). The examples described herein describe systems and methods of dynamically updating one or more attributes of virtual objects that correspond to real objects.

Figure 2:
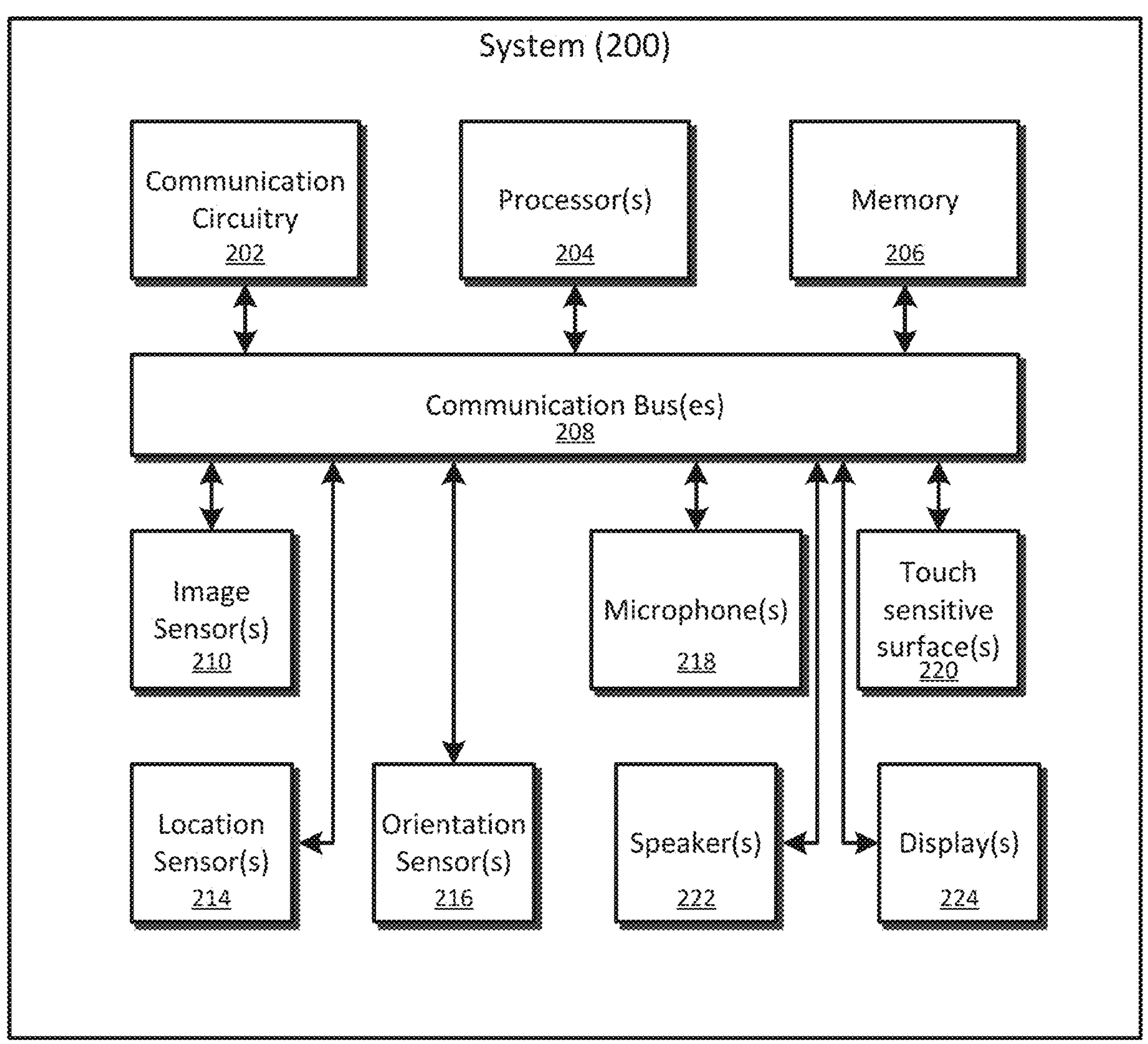
FIG. 2 illustrates a block diagram of exemplary architectures for an electronic device according to some aspects of the disclosure.

FIG. 2 illustrates a block diagram of exemplary architectures for a system or device 200 in accordance with some aspects. In some aspects, device 200 is a mobile device, such as a mobile phone (e.g., smart phone), a tablet computer, a laptop computer, a desktop computer, an auxiliary device in communication with another device, etc. In some aspects, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, and/or display(s) 224. These components optionally communicate over communication bus(es) 208 of device 200.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication and/or short-range communication, such as Bluetooth®.

Processor(s) 204 include one or more general processors, one or more graphics processors, and/or one or more digital signal processors. In some aspects, memory 206 is a non-transitory computer-readable storage medium (e.g., flash memory, random access memory) that stores computer-readable instructions configured to be executed by processor(s) 204 to perform the techniques, processes, and/or methods described below (e.g., with reference to FIGS. 3-7). In some aspects, memory 206 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some aspects, the storage medium is a transitory computer-readable storage medium. In some aspects, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display(s) 224. In some aspects, display(s) 224 can include a single display such as an LED or LCD display, and in other aspects the display generation component(s) can include a projector, a display with touch capability, a retinal projector, and the like. In some aspects, display(s) 224 includes multiple displays. In some aspects, device 200 includes touch-sensitive surface(s) 220 for receiving user inputs, such as tap inputs and swipe inputs or other gestures. In some aspects, display(s) 224 and touch-sensitive surface(s) 220 form touch-sensitive display(s), for example a touch screen integrated with device 200 or external to device 200 that is in communication with device 200.

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the real environment. Image sensor(s) 210 also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 210 also optionally include one or more event camera(s) configured to capture movement of physical objects in the real environment. Image sensor(s) 210 also optionally include one or more depth sensor(s) configured to detect the distance of physical objects from device 200. In some aspects, information from one or more depth sensor(s) can allow the device to identify and differentiate objects in the real environment from other objects in the real environment. In some aspects, one or more depth sensor(s) can allow the device to determine the texture and/or topography of objects in the real environment.

In some aspects, device 200 uses CCD sensors, event cameras, and depth sensors in combination to detect the physical environment around device 200. In some aspects, image sensor(s) 220 include a first image sensor and a second image sensor. The first image sensor and the second image sensor work in tandem and are optionally configured to capture different information of physical objects in the real environment. In some aspects, the first image sensor is a visible light image sensor, and the second image sensor is a depth sensor. In some aspects, device 200 uses image sensor(s) 210 to detect the position and orientation of device 200 and/or display(s) 224 in the real environment. For example, device 200 uses image sensor(s) 210 to track the position and orientation of display(s) 224 relative to one or more fixed objects in the real environment.

In some aspects, device 200 includes microphones(s) 218. Device 200 uses microphone(s) 218 to detect sound from the user and/or the real environment of the user. In some aspects, microphone(s) 218 includes an array of microphones (including a plurality of microphones) that optionally operate in tandem, such as to identify ambient noise or to locate the source of sound in space of the real environment.

Device 200 includes location sensor(s) 214 for detecting a location of device 200 and/or display(s) 224. For example, location sensor(s) 214 can include a GPS receiver that receives data from one or more satellites and allows device 200 to determine the device's absolute position in the physical world.

Device 200 includes orientation sensor(s) 216 for detecting orientation and/or movement of device 200 and/or display(s) 224. For example, device 200 uses orientation sensor(s) 216 to track changes in the position and/or orientation of device 200 and/or display(s) 224, such as with respect to physical objects in the real environment. Orientation sensor(s) 216 optionally include one or more gyroscopes and/or one or more accelerometers. Device 200 is not limited to the components and configuration of FIG. 2, but can include other or additional components in multiple configurations.

Attention is now directed towards examples of graphical user interfaces ("GUIs") and associated processes that are implemented on an electronic device, such as electronic device 100 or device 200. The GUIs can include display of one or more virtual objects corresponding to physical objects authorized by manufacturers for sale by one or more retailers.

FIGS. 3A-3K illustrate examples of an electronic device 200 automatically arranging virtual objects in a three-dimensional, extended reality ("XR") environment 301 according to some aspects of the disclosure. As shown in FIGS. 3A-3K, in some aspects, the electronic device 200 is a tablet computer including a touch screen display 224 and front-facing image sensors 210. In some aspects, the electronic device 200 further includes rear-facing image sensors (e.g., cameras) positioned to capture a portion of the physical environment of the electronic device 200 that the user of the electronic device 200 is facing while looking at the display 224 of the electronic device 200. Illustrating the electronic device 200 as a tablet computer in FIGS. 3A-3K is meant as a non-limiting example; in some aspects, electronic device 200 is a different device, such as a smartphone, laptop or desktop computer, or wearable device (e.g., a head-mounted display).

In some aspects, the XR environment 301 includes representations of real objects in the physical environment of the electronic device 200 and/or representations of virtual objects. In some aspects, the electronic device 200 uses passthrough techniques to display the representations of real objects in the XR environment 301. In some aspects, the electronic device 200 uses "true" or "real" passthrough, including making portions of the physical environment of the electronic device 200 visible to the user through a transparent portion of display 224. In some aspects, the electronic device 200 uses "video" or "virtual" passthrough, including displaying representations of portions of the physical environment of the electronic device 200 using the display 224.

In some aspects, the XR environment 301 further includes virtual objects, such as application user interfaces and/or virtual representations of real objects, such as furniture. Examples of virtual objects are described in more detail below with reference to FIGS. 3A-3K. In some aspects, the virtual objects are interactive; for example, the electronic device 200 updates one or more characteristics of a virtual object in response to one or more inputs. In some aspects, displaying virtual objects, including virtual representations of real objects not present in the physical environment of the electronic device 200, allows the user to see what the real objects corresponding to the virtual objects would look like in the physical environment of the electronic device 200. In some aspects, the electronic device 200 displays the virtual objects at a size corresponding to the size of the real objects to create a realistic image of the physical environment including the real object corresponding to the virtual object.

In some aspects, manufacturers and/or resellers of physical goods make virtual objects corresponding to physical objects made and/or sold by the manufacturers and/or resellers available to the user of the electronic device 200. For example, the virtual objects are available through online stores, emails, and/or social media posts. In some aspects, the electronic device 200 saves collections of virtual objects optionally including objects from a plurality of different manufacturers and/or resellers. The electronic device 200 optionally displays the representations of the virtual objects with different renderings depending on the application being used to display the virtual objects and/or the context in which the objects are displayed. For example, a whiteboarding application displays two-dimensional or three-dimensional representations of the virtual objects arranged in a collage arranged automatically or by the user. As another example, a spreadsheet application displays metadata corresponding to virtual objects in a spreadsheet, optionally without displaying images of the virtual objects.

In some aspects, the electronic device 200 displays three-dimensional representations of the virtual objects in an XR environment 301 that includes portions of the physical environment of the electronic device. As described in more detail below with reference to FIGS. 3A-3K, in some aspects, the electronic device 200 automatically arranges one or more virtual objects in the XR environment 301 based on characteristics of the physical environment of the electronic device 200 and/or characteristics of the virtual objects. Automatically arranging virtual objects in the XR environment 301 enhances user interactions with the electronic device 200 by reducing the time it takes to display the objects in a realistic arrangement and/or suggesting an arrangement of the objects that is likely to be aesthetically pleasing to the user of the electronic device 200.

FIGS. 3A-3K illustrate examples of the electronic device 200 displaying user interfaces and/or XR environments 301 for interacting with virtual objects. Additionally, FIGS. 3A-3K include a bird's eye view 305 of the XR environment indicating placement of real and virtual objects in the XR environment 301 for ease of understanding.

Figure 3A:
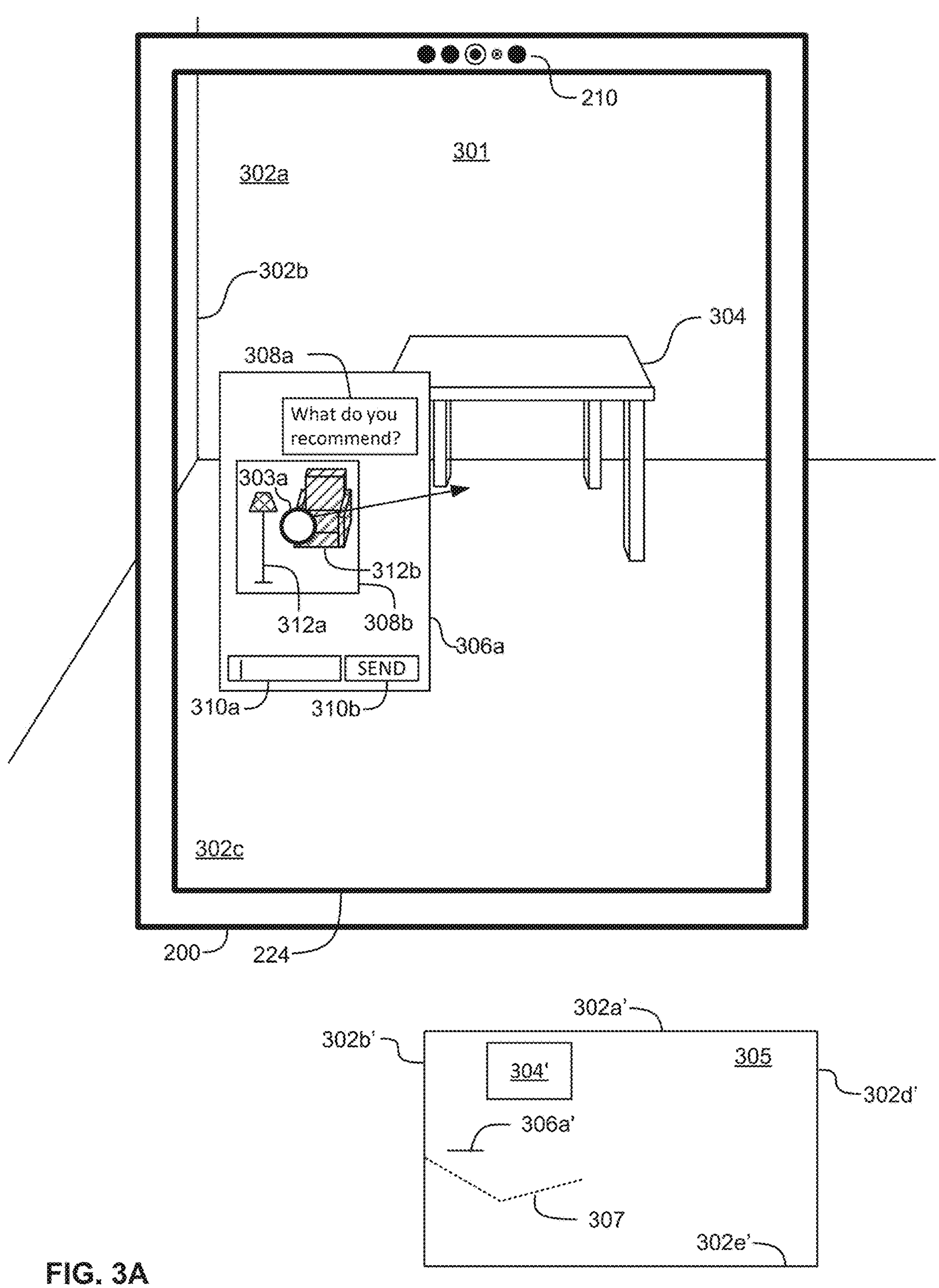
FIGS. 3A-3K illustrate examples of the electronic device displaying user interfaces and/or XR environments for interacting with virtual objects according to some aspects of the disclosure.

FIG. 3A illustrates the electronic device 200 displaying a messaging user interface 306*a* in the XR environment 301. In some aspects, the messaging user interface 306*a* includes a representation 308*a* of a message sent from the electronic device 200, a representation 308*b* of a message sent to the electronic device 200 by a different electronic device, a text entry field 310*a*, and a selectable option 310*b* that, when selected, causes the electronic device 200 to send a message to the messaging conversation including the contents of text entry field 310*a*. As shown in the example of FIG. 3A, the representation 308*b* of the message from the other device includes a collection of virtual objects, including a representation 312*a* of a virtual lamp and a representation 312*b* of a virtual chair. In some aspects, the message corresponding to representation 312*b* includes files associated with the virtual lamp and virtual chair including metadata about these objects and one or more renderings of these objects. For example, while displaying the representations 312*a* and 312*b* of virtual objects in the representation 312*b* of the message, the electronic device 200 displays the representations 312*a* and 312*b* of the virtual objects in two dimensions and at a size independent from the physical size of the real objects corresponding to the virtual objects. As described above and in more detail below, in some aspects, the electronic device 200 displays different renderings of the representations 312*a* and 312*b* and/or different metadata about the objects depending on the application and/or context in which the electronic device 200 displays the representations 312*a* and 312*b*.

In some aspects, the electronic device 200 displays representations of virtual objects in user interfaces other than the messaging user interface 306*a*. For example, the electronic device 200 displays one or more representations of virtual objects in note-taking user interfaces, word processing user interfaces, web browsing user interfaces, and/or collage/pinboard user interfaces. In some aspects, the electronic device presents and/or stores collections of a plurality of virtual objects that are curated by a user or automatically curated. For example, the virtual objects in the representation of message 308*b* are curated by a user of another electronic device and/or automatically generated by the other electronic device.

As shown in the example of FIG. 3A, the XR environment 301 further includes representations of a real table 304, real walls 302*a* and 302*b*, and real floor 302*c* in the physical environment of the electronic device 200. While displaying the messaging user interface 306*a* in the XR environment 301, the electronic device 200 receives an input 303*a* corresponding to a request to display the representation 312*a* of the lamp and the representation 312*b* of the chair in the XR environment 301 outside of the messaging user interface 306*a*. For example, the input 303*a* is an input selecting the representation 308*b* of the message and dragging the representation 308*b* out of the messaging user interface 306*a* using a cursor and/or a gesture performed with a hand and/or finger of the user. In some aspects, the electronic device 200 detects gestures performed with the user's hand(s) and/or finger(s) using a touch screen display 224 and/or image sensors 210.

In some aspects, the lamp corresponding to representation 312*a* and the chair corresponding to representation 312*b* are part of a collection of virtual objects. In some aspects, the collection was created by the user that sent the message corresponding to representation 308*b* including the representations 312*a* and 312*b* of the objects. In some aspects, sources (e.g., manufacturers and/or retailers) of virtual objects provide metadata including recommendations of groups of virtual objects and/or how to place the virtual objects relative to each other. In some aspects, the collection was automatically curated by an electronic device based on other objects saved by the user and/or characteristics of a physical environment. For example, the electronic device selects objects for the collection based on the color(s), style(s), brand(s), and/or type(s) of furniture in a physical environment. For example, the electronic device chooses objects for the collection that match objects in the physical environment and/or are types of furniture not included in the physical environment. For example, the electronic device selected the lamp corresponding to representation 312*a* and chair corresponding to representation 312*b* because the environment corresponding to the collection did not include a lamp or chair and/or included objects that match the lamp and/or chair included in the collection. As another example, the electronic device selected the lamp corresponding to representation 312*a* and chair corresponding to representation 312*b* based on the size and/or colors of walls in a physical environment and/or the size and/or location of windows in the physical environment. In some aspects, objects included in an automatically curated collection have different sources (e.g., manufacturers or resellers) and/or are sourced from different online stores. In some aspects, objects included in an automatically curated collection have the same source and/or are sourced from the same online store.

As shown in FIG. 3A, the electronic device 200 detects a user input 303*a* corresponding to a request to drag the representation 312*a* of the lamp and the representation 312*b* of the chair into a portion of the XR environment 301 outside of the messaging user interface 306*a*. In some aspects, receiving the input 303*a* includes detecting the user perform a gesture (e.g., using their hand(s) and/or finger(s) using a touch-sensitive display 224 and/or image sensor(s) 210 of the electronic device 200. In some aspects, receiving the input 303*a* includes detecting an input received using a mouse, trackpad, keyboard, or other input device in communication with the electronic device 200. In some aspects, while receiving the input 303*a*, the electronic device 200 displays a cursor or other indication of input focus.

Figure 3B:
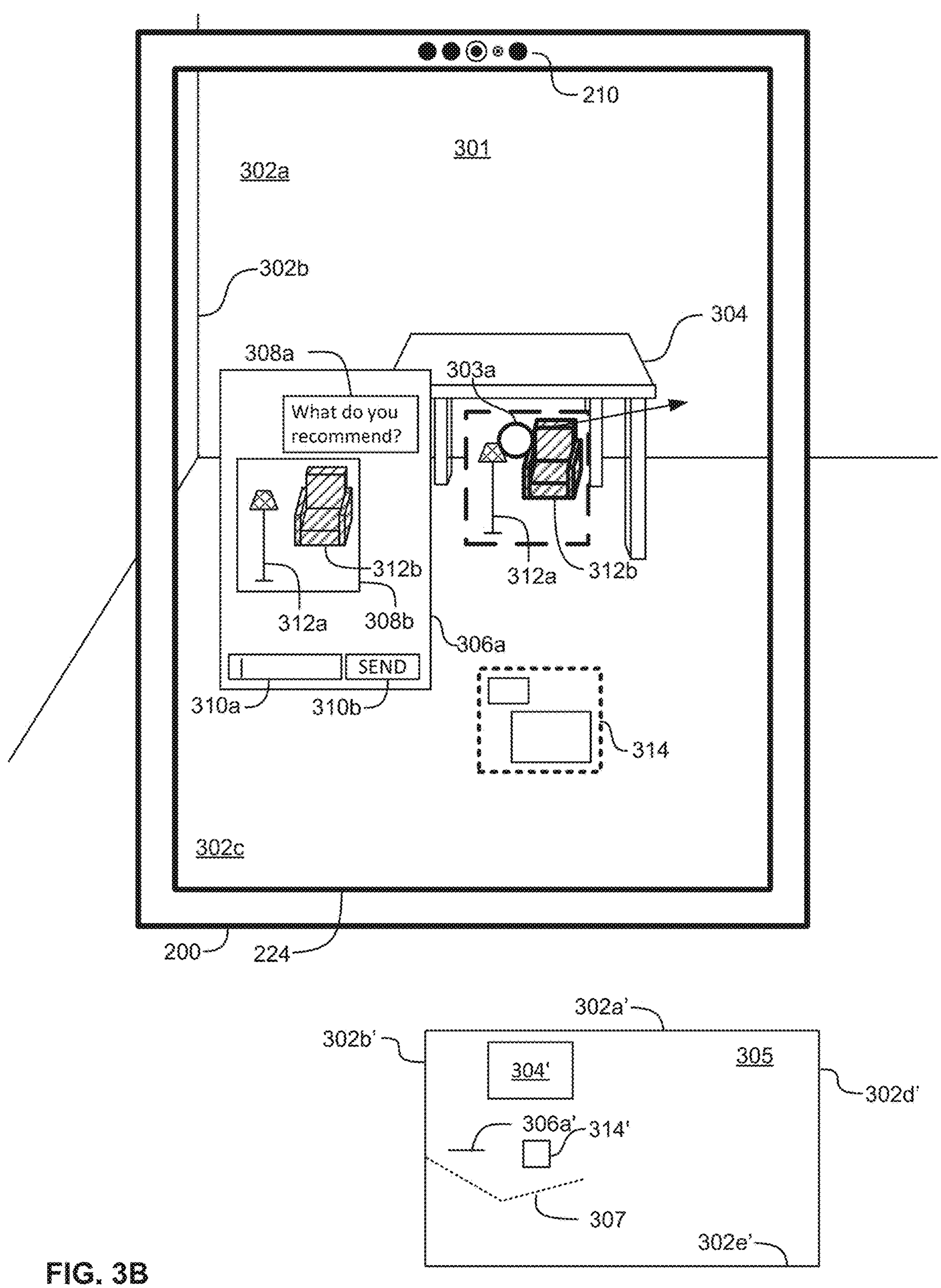

The input that begins in FIG. 3A optionally continues as shown in FIG. 3B. In some aspects, in response to the input shown in FIGS. 3A and 3B, the electronic device 200 displays the representation 312*a* of the lamp and the representation 312*b* of the chair in the XR environment 301 in three dimensions and at sizes corresponding to the sizes of the real lamp corresponding to representation 312*a* and the real chair corresponding to representation 312*b*.

FIG. 3B illustrates an example of a continuation of the input 303*a* shown in FIG. 3A. In some aspects, in response to detecting that the input 303*a* has dragged the representation 312*a* of the lamp and the representation 312*b* of the chair out of the messaging user interface 306*a*, the electronic device 200 displays a visual indication 314 in the XR environment 301 that releasing the input 303*a* will cause the electronic device 200 to place the representation 312*a* of the lamp and the representation 312*b* of the chair in the XR environment 301. In some aspects, as the electronic device 200 continues to detect movement of input 303*a*, the electronic device 200 updates the position of the indication 314 to continue to correspond to the location of the input 303*a* and/or the location of the representation 312*a* of the lamp and the representation 312*b* of the chair. In some aspects, in response to detecting a different input dragging a representation of a single virtual object into the XR environment 301, the electronic device 200 displays an indication similar to indication 314 but with a different image indicating that one object is being dragged into the XR environment 301 instead of multiple objects being dragged into the XR environment 301.

Figure 3C:
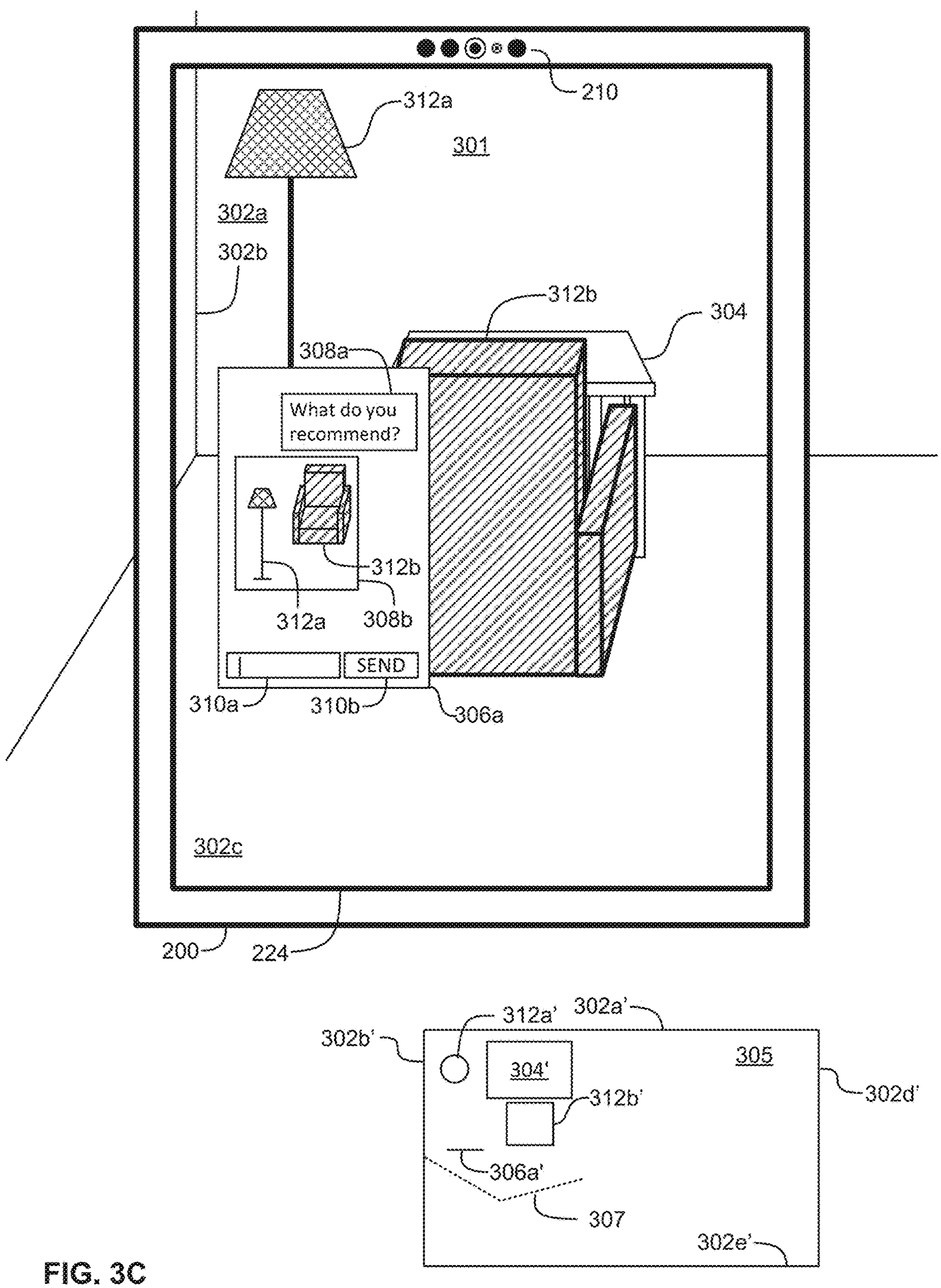

FIG. 3C illustrates an example of the electronic device 200 displaying the representation 312*a* of the lamp and the representation 312*b* of the chair in the XR environment 301 in response to detecting the end of the input illustrated in FIGS. 3A-3B. In some aspects, the end of the input is a release of the "drag" input shown in FIGS. 3A-3B, thereby "dropping" the representations 312*a* and 312*b* in the XR environment 301 outside of the messaging conversation 306*a*. In some aspects, the electronic device 200 automatically arranges the representation 312*a* of the lamp and the representation 312*b* of the chair in response to the input shown in FIGS. 3A-3B.

In some aspects, the electronic device 200 uses scene understanding to evaluate the portions of the physical environment included in XR environment 301 to automatically place the representations 312*a* and 312*b* in the XR environment 301. For example, the electronic device 200 identifies walls 302*a*', 302*b*' 302*d*' and/or 302*e*' shown in top-down view 305, the floor 302*c*, and/or furniture (e.g., real desk corresponding to representation 304) in the physical environment of the electronic device 200. In some aspects, the electronic device 200 uses characteristics of these objects, such as their size(s) and/or location(s) to place the representations 312*a* and/or 312*b* in the XR environment 301.

In some aspects, automatically arranging representations 312*a* and 312*b* in the environment includes selecting a pair of adjacent walls in the XR environment 301 along which to orient the representations 312*a* and 312*b*. In some aspects, the electronic device 200 identifies the walls 302*a*', 302*b*' 302*d*' and/or 302*e*' shown in top-down view 305 and evaluates adjacent pairs of walls according to a set of ranked and/or weighted criteria. For example, the criteria include proximity of the walls to the location of the electronic device 200 in the XR environment 301, proximity of the walls to a location in the XR environment 301 where the user of the electronic device 200 is looking, proximity of the walls to the user interface the representations 312*a* and 312*b* came from (e.g., messaging user interface 306*a*), and available space along the walls due to presence of furniture or other real objects in the physical environment of the electronic device 200 included in the XR environment 301.

In some aspects, the virtual objects include metadata indicating how the objects should be placed relative to other real and/or virtual objects in the three-dimensional environment 301. For example, the virtual chair corresponding to representation 312*b* includes an indication that the chair may be placed facing a desk or table, so the electronic device 200 places the representation of the chair 312*b* facing the representation 304 of the real table in the XR environment 301. As another example, the virtual lamp corresponding to representation 312*a* includes an indication that the lamp may be placed near chairs, sofas, and/or other seating furniture, so the electronic device 200 places the representation of the lamp 312*a* proximate to the representation 312*b* of the virtual chair and the representation 304 of the real table. In some aspects, the sources (e.g., manufacturers and/or retailers) of the virtual objects provide recommendations of virtual objects that go together and/or how to place two or more virtual objects relative to each other. In some aspects, these recommendations are included in metadata associated with the virtual objects. In some aspects, sources provide metadata that informs the system how to place virtual objects relative to virtual objects provided by a different source. In some aspects, the metadata is provided in a standardized format and/or includes indications of attributes of the virtual objects that are not necessarily specific to a respective source. In some aspects, the locations at which the electronic device 200 places the representation 312*a* of the lamp and the representation 312*b* of the chair are independent from the particular location at which the drag and drop input 303*a* shown in FIGS. 3A-3B is released.

In some aspects, while the electronic device 200 displays the representation 312*a* of the virtual lamp and the representation 312*b* of the virtual chair in the XR environment 301, the representations 312*a* and 312*b* are interactive. For example, the electronic device 200 repositions the representations 312*a* and/or 312*b*, shows more information about the virtual object(s) corresponding to the representations 312*a* and/or 312*b*, and/or adjusts the representations 312*a* and/or 312*b* in accordance with available adjustments to the object(s) corresponding to the representations 312*a* and/or 312*b* in response to user inputs. Examples of interactions such as these are described in more detail below with reference to FIGS. 3E-3K.

Figure 3D:
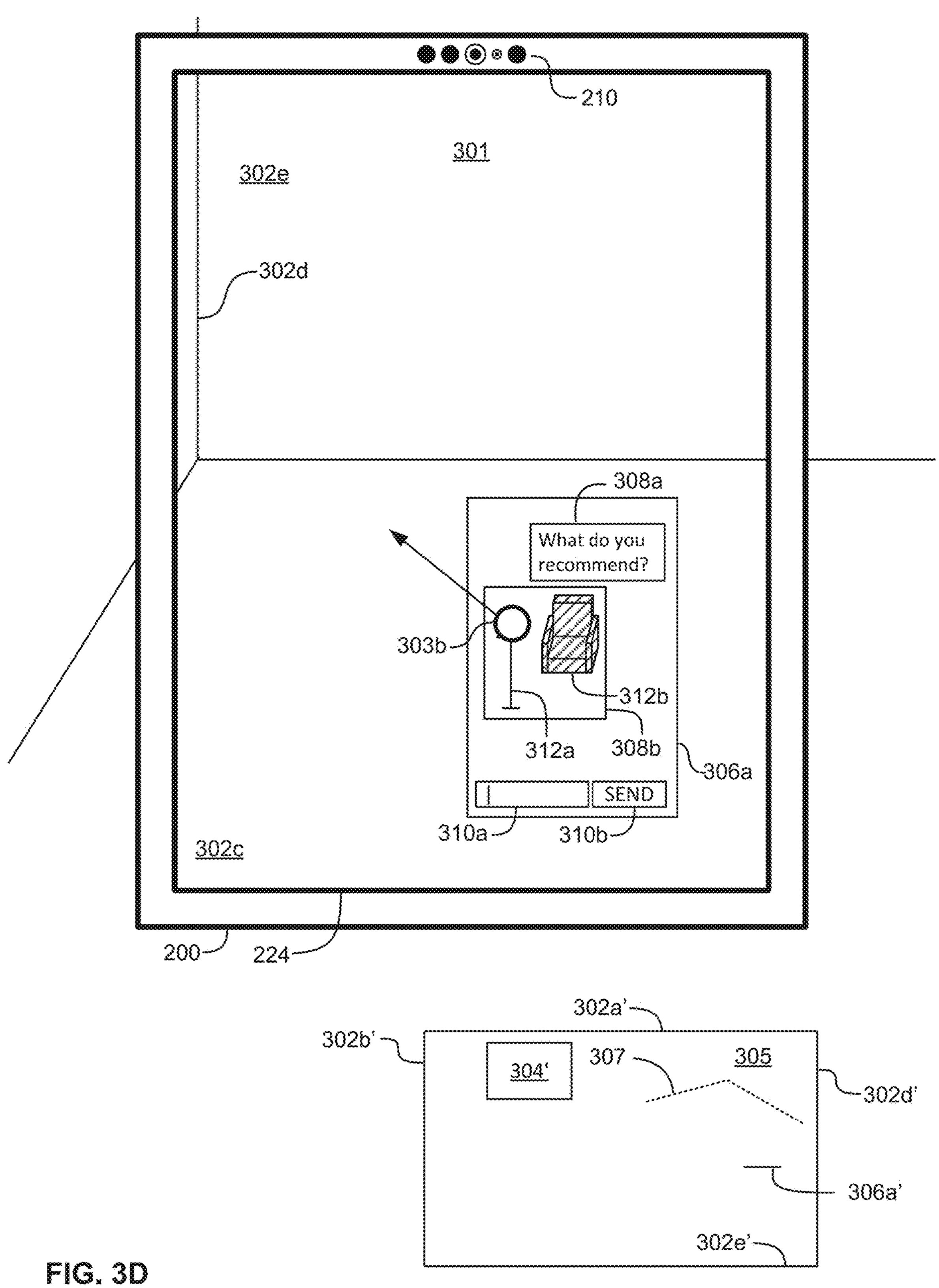

FIG. 3D illustrates an example of the electronic device 200 displaying the messaging user interface 306*a* while the viewpoint 307 of the electronic device 200 is at a different location than the location in FIGS. 3A-3C. As described above, in some aspects, the electronic device 200 selects a region of the XR environment 301 in which to place the representations 312*a* and 312*b* of virtual objects based on proximity of the user and/or messaging user interface 306*a* to adjacent pairs of walls in the XR environment 301. For example, in FIGS. 3A-3C, the user is closer to walls 302*a* and 302*b* than they are to walls 302*d* and 302*e* and in FIG. 3D, the user is closer to walls 302*d* and 302*e* than they are to walls 302*a* and 302*b*.

In FIG. 3D, the electronic device 200 receives an input 303*b* dragging the representation 312*a* of the lamp and the representation 312*b* of the chair into the XR environment 301 from the messaging user interface 306*a*. In some aspects, the input 303*b* in FIG. 3D is similar to the input 303*a* in FIGS. 3A-3B. For example, in response to detecting the input 303*b* move from inside the messaging user interface 306*a* to outside of the messaging user interface 306*a*, the electronic device 200 displays a visual indication similar to indication 314 in FIG. 3B.

Figure 3E:
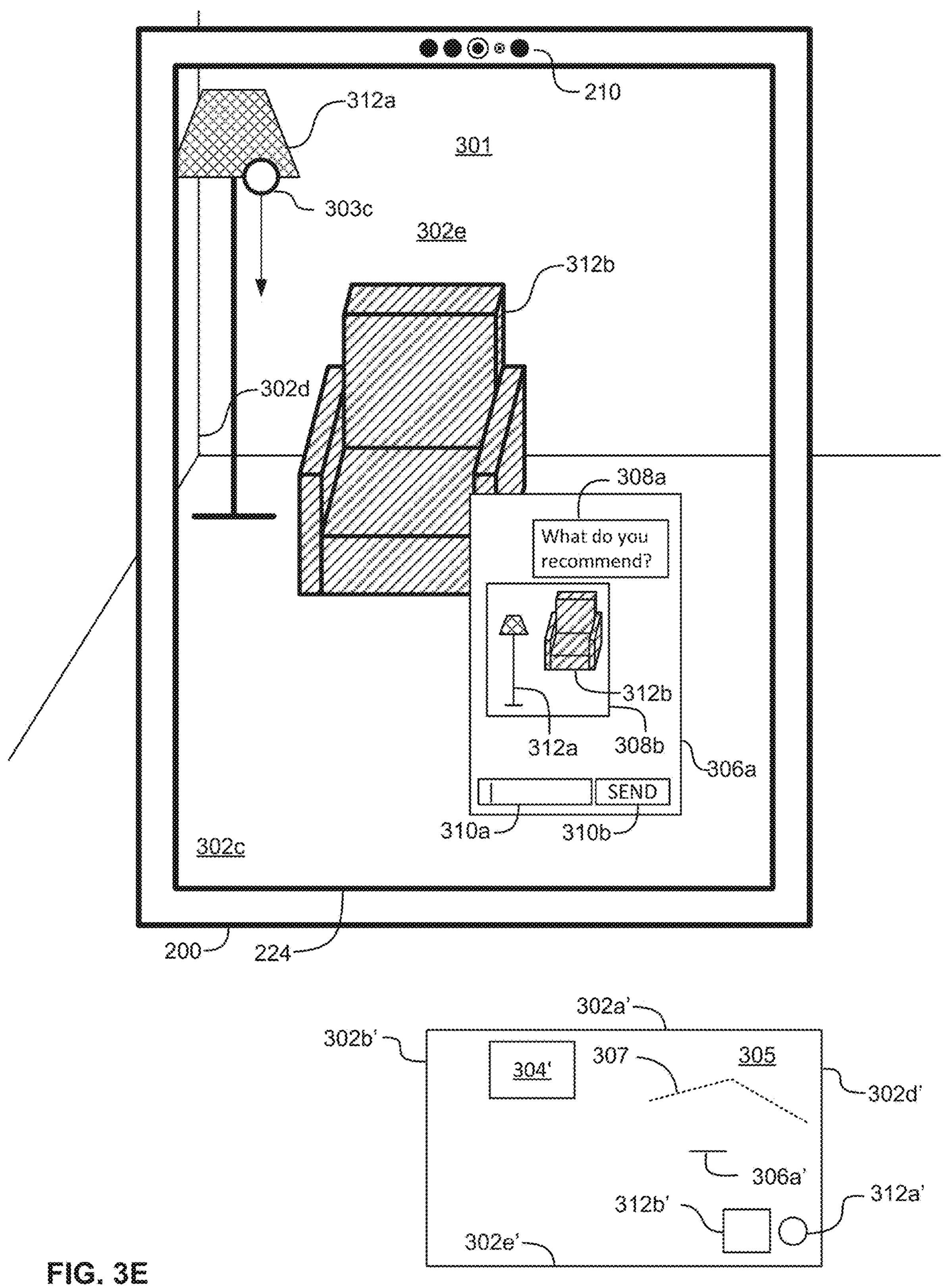

In some aspects, in response to detecting the input 303*b* drag and drop the representations 312*a* and 312*b* into the XR environment 301, the electronic device 200 automatically places the representation 312*a* of the virtual lamp and the representation 312*b* of the virtual chair in the XR environment 301, as shown in FIG. 3E. In some aspects, the locations in the XR environment 301 at which the electronic device 200 places the representation 312*a* of the virtual lamp and the representation 312*b* of the virtual chair in response to input 303*b* is based on the location of the electronic device 200, the messaging user interface 306*a*, and/or the gaze of the user in FIG. 3D. For example, in FIG. 3D, the gaze of the user faces walls 302*d* and 302*e*, so the electronic device 200 places the representation 312*a* of the virtual lamp and the representation 312*b* of the virtual chair 312*b* along walls 302*e* and/or 302*d* in response to the input 303*b* in FIG. 3D, as shown in FIG. 3E.

FIG. 3E illustrates an example of the electronic device 200 displaying the representation 312*a* of the virtual lamp and the representation 312*b* of the virtual chair in the XR environment in response to the input illustrated in FIG. 3D. In some aspects, the electronic device 200 places the representations 312*a* and 312*b* in the environment according to the set of criteria described above.

In some aspects, because the position and orientation of the electronic device 200 in the XR environment 301 is different in FIG. 3D-3E than in FIGS. 3A-3C, the arrangement of representations 312*a* and 312*b* is different in FIG. 3E than in FIG. 3C. For example, as described above, the electronic device 200 arranges the representations 312*a* and 312*b* along walls 302*d* and 302*e* based on the location of messaging user interface 306*a*, the gaze of the user, and/or the location and/or orientation of the electronic device 200 such that the electronic device 200 displays walls 302*d* and 302*e*. Also, for example, because there is no real furniture in the vicinity of walls 302*d* and 302*e* unlike the example in FIGS. 3A-3C, the placement of the representation 312*a* of the lamp and the representation 312*b* of the chair relative to each other and/or the walls 302*d* and 302*e* is different from the placement of the representation 312*a* of the lamp and the representation 312*b* of the chair relative to each other and/or the walls 302*a* and 302*b* in FIG. 3C. For example, the representation 312*b* of the chair is positioned so that the chair faces away from wall 302*e* rather than the representation 312*b* of the chair being positioned so that the chair faces wall 302*a* and the representation 304 of the table in FIG. 3C.

Figure 3F:
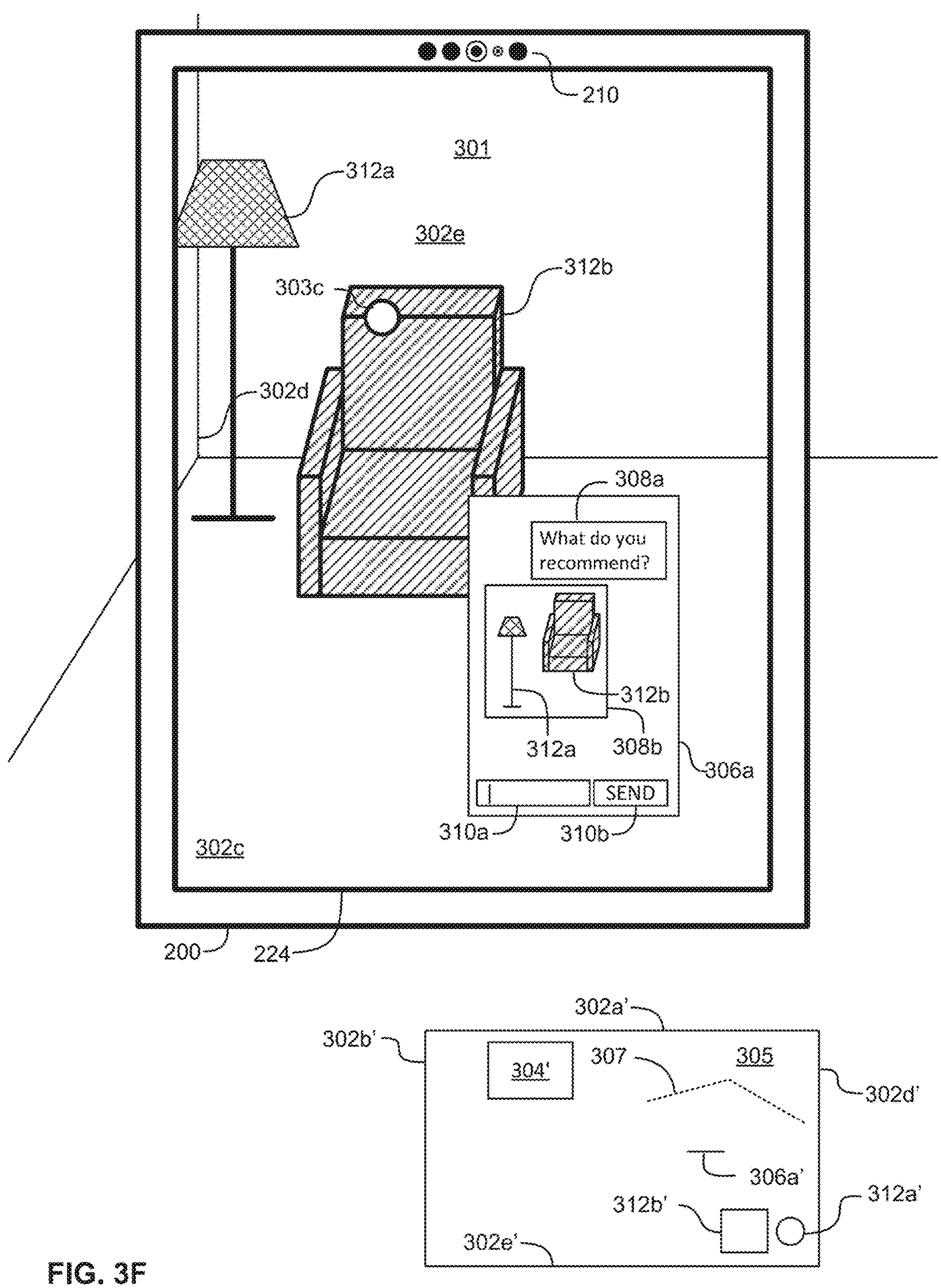

As described above, in some aspects, the representations 312*a* and/or 312*b* of virtual objects displayed in the XR environment 301 are interactive. For example, the representation 312*a* of the virtual lamp is adjustable in the ways in which the real lamp corresponding to the virtual lamp is adjustable, such as changing the height of the lamp. In FIG. 3E, the electronic device 200 receives an input 303*c* adjusting the height of the representation 312*a* of the virtual lamp. In response to the input in FIG. 3E, the electronic device 200 updates the representation 312*a* of the lamp as shown in FIG. 3F in accordance with the input 303*c*. In some aspects, other types of adjustments to virtual objects are possible in accordance with the types of adjustments that are possible for the real objects that correspond to the virtual objects. For example, if an object has one or more movable parts, the electronic device 200 displays motion of those parts in response to an input directed to the movable part of the virtual object.

FIG. 3F illustrates an example of the electronic device 200 displaying the representation 312*a* of the lamp in the XR environment 301 updated in response to the input illustrated in FIG. 3E. As shown in FIG. 3F, because the input in FIG. 3E corresponded to a request to reduce the height of the representation 312*a* of the lamp, the height of the representation 312*a* of the lamp is reduced.

Additionally or alternatively, in some aspects, representations of virtual objects are selectable to display additional information about the virtual objects. In FIG. 3F, the electronic device 200 receives an input 303*c* selecting the representation 312*b* of the virtual chair, for example. In some aspects, receiving the input includes detecting a gesture with an image sensor or touch-sensitive surface, detecting the gaze of the user, and/or detecting manipulation of another input device in communication with the electronic device 100. In some aspects, in response to the input illustrated in FIG. 3F, the electronic device 200 displays additional information about the virtual chair, as shown in FIG. 3G.

Figure 3G:
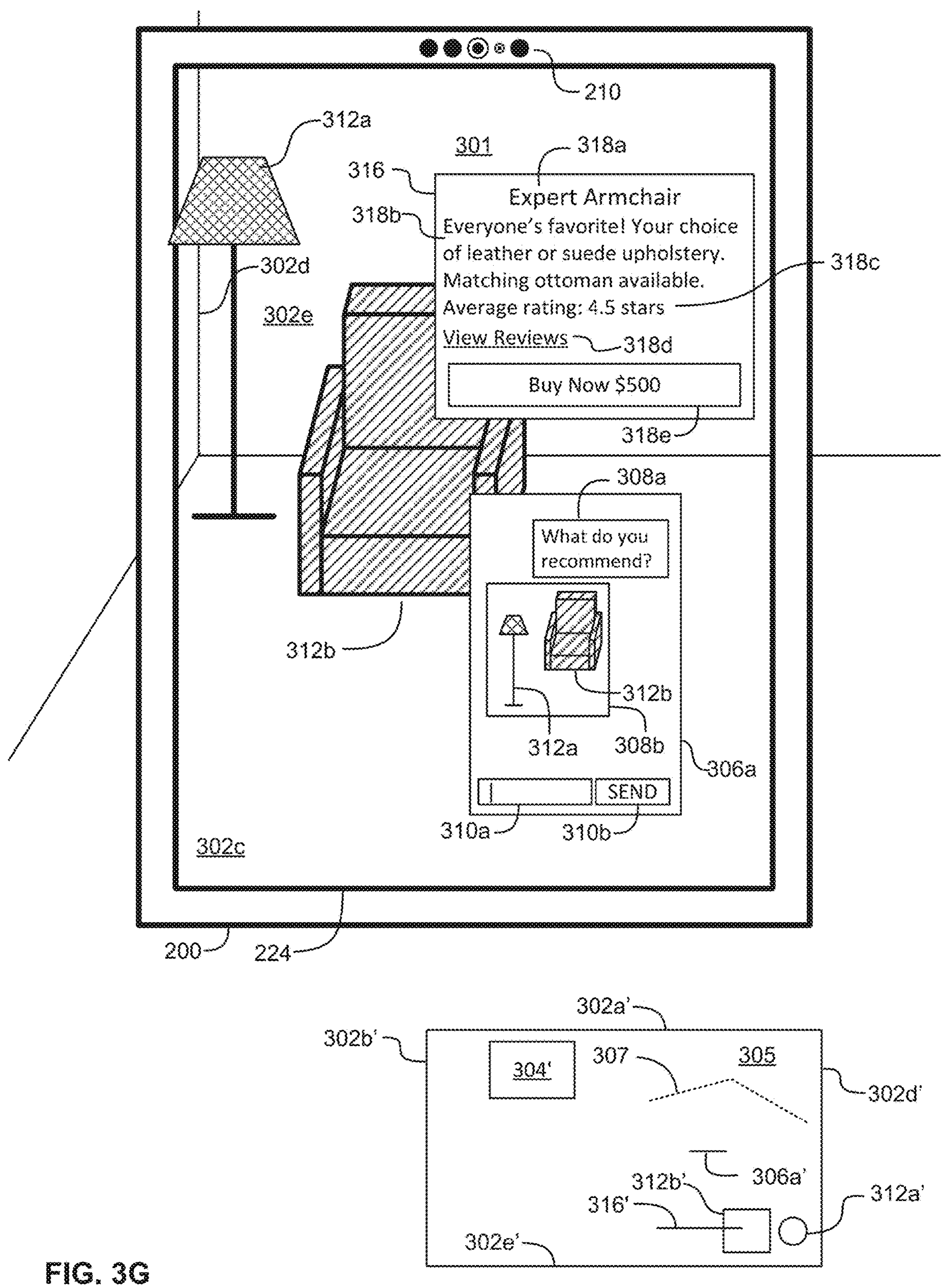

FIG. 3G illustrates an example of the electronic device 200 displaying a user interface 316 including information about the virtual chair in response to receiving the input in FIG. 3F. In some aspects, the user interface includes an indication 318*a* of the product name of the chair, a description 318*b* of the chair, an indication 318*c* of the average customer rating of the chair, an indication 318*d* of customer reviews of the chair and a selectable option 318*e* that, when selected, causes the electronic device 200 to initiate a process to purchase the chair. In some aspects, the user interface 316 further includes the contents of one or more reviews of the chair and/or additional photos of the chair. In some aspects, in response to detecting selection of the indication 318*d* of customer reviews, the electronic device 200 updates the user interface 316 to include the customer reviews. In some aspects, in response to detecting selection of the selectable option 318*e* to buy the chair, the electronic device 200 displays a payment user interface including fields to enter a shipping address and/or payment method to purchase the chair. In some aspects, the electronic device 100 additionally or alternatively displays a selectable option that, when selected, causes the electronic device 100 to initiate a process to purchase all of the items in the collection of virtual objects, such as a process to purchase the lamp and the chair. In some aspects, in response to receiving an input selecting the representation 312*a* of the lamp, the electronic device 200 displays a user interface including information about the lamp that is similar to the user interface 316 illustrated in FIG. 3G.

In some aspects, the electronic device 200 automatically arranges representations of virtual objects from multiple collections and/or applications. In some aspects, in response to receiving an input adding one or more representations of virtual objects to the XR environment 301 from different collection(s) and/or source(s) than those of the virtual objects already in the XR environment 301, the electronic device 200 automatically places the additional virtual objects in the XR environment 301 and/or updates the position(s) of one or more virtual objects already in the XR environment 301.

Figure 3H:
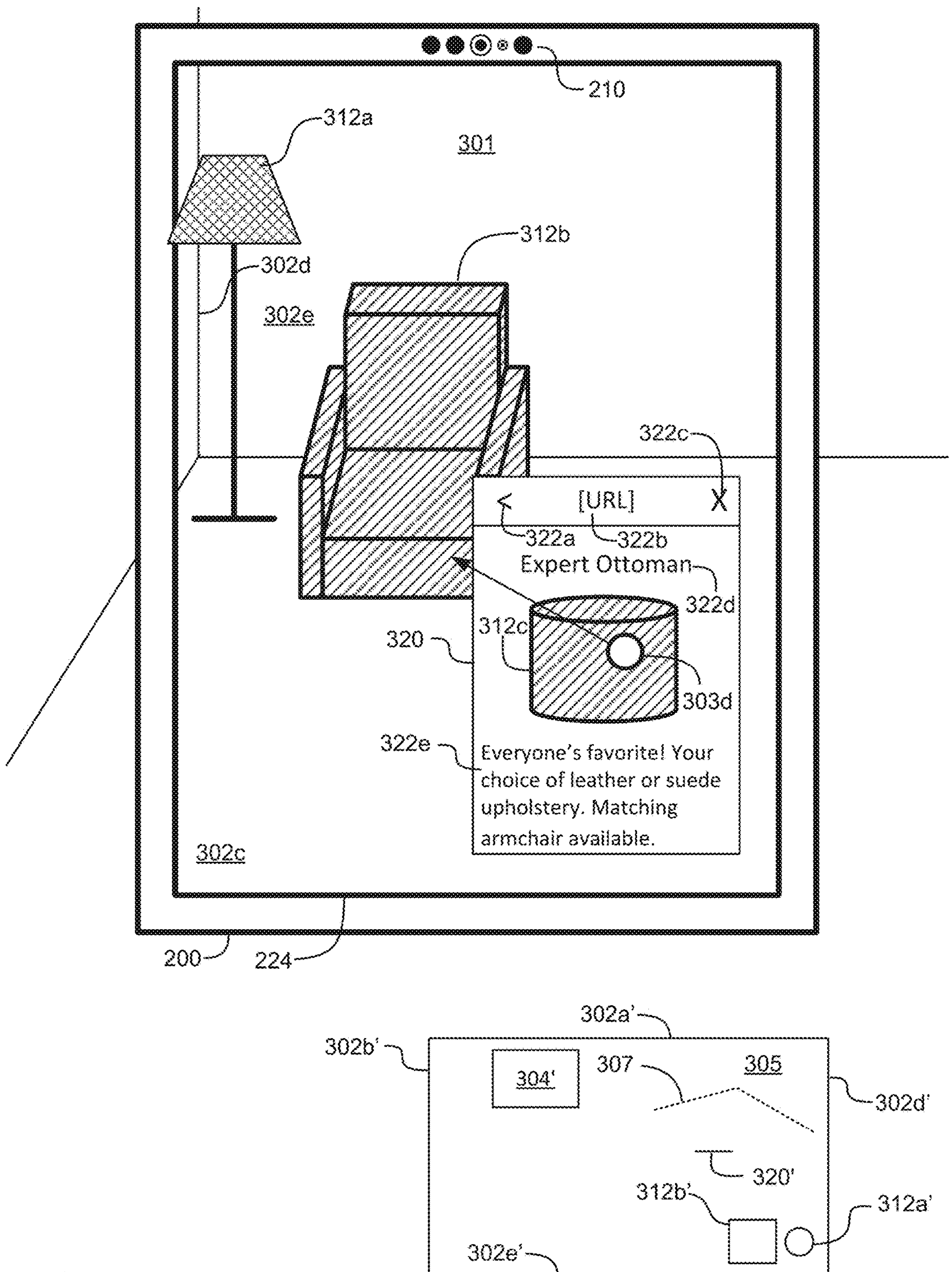

FIG. 3H illustrates an example of the electronic device 200 displaying a web browsing user interface 320 in the XR environment 301 that includes the representation 312*a* of the lamp and the representation 312*b* of the chair. As shown in FIG. 3H, the web browsing user interface 320 includes a representation 312*c* of a virtual ottoman. For example, the web browsing user interface 320 displays a product page of the ottoman in an online store. In some aspects, the web browsing user interface 320 further includes an option 322*a* to navigate back in the web browsing user interface 320, an indication 322*b* of the URL of the website displayed in the web browsing user interface 320, an option 322*c* to close the web browsing user interface 320, and a description 322*e* of the ottoman. In some aspects, the product page website further includes ratings and/or reviews for the ottoman, links to similar products, additional images of the ottoman, and/or an option to purchase the ottoman.

As shown in FIG. 3H, the electronic device 200 receives an input 303*d* dragging the representation 312*c* from the web browsing user interface 302 into the XR environment 301. In some aspects, while detecting the input 303*d*, in response to detecting movement of the input 303*d* and representation 312*d* out of the web browsing user interface 320, the electronic device 200 displays an indication similar to the indication 314 in FIG. 3B. In some aspects, because the input 303*d* in FIG. 3H is directed to a single object instead of a group of objects as was the case in FIG. 3B, the image included in the indication similar to indication 314 is a different image. In some aspects, in response to the input illustrated in FIG. 3H, the electronic device 200 displays the representation 312*c* of the ottoman in the XR environment 301 at a location and/or orientation automatically selected by the electronic device 200, as shown in FIG. 3I.

Figure 3I:
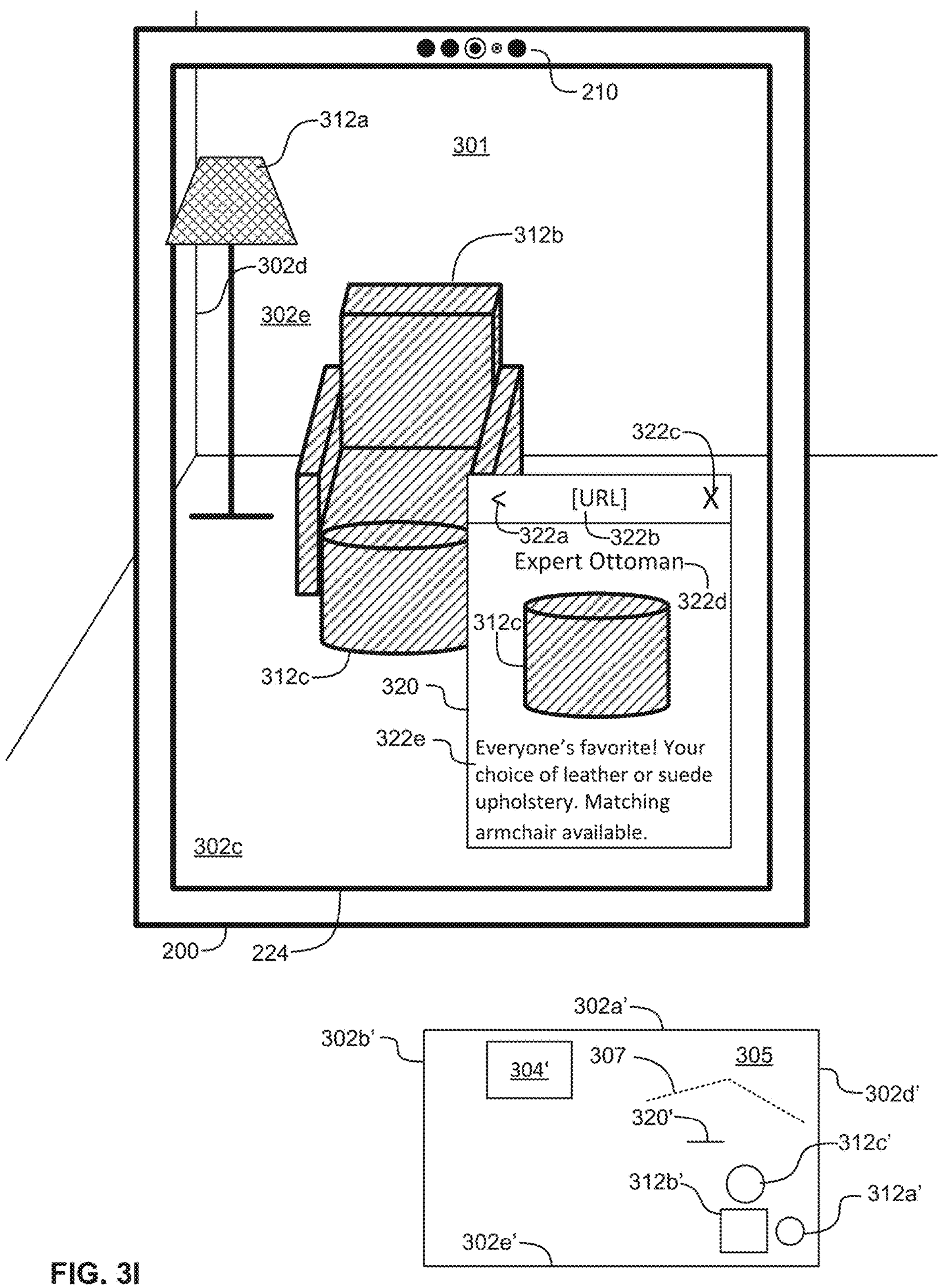

FIG. 3I illustrates an example of the electronic device 200 displaying the representation 312*c* of the ottoman in the XR environment 301 in response to the input illustrated in FIG. 3H. For example, in FIG. 3I, the electronic device 200 displays the representation 312*c* of the ottoman in front of the representation 312*b* of the chair because the ottoman and/or the chair includes metadata indicating that the representation 312*c* of the ottoman can be placed in front of the representation 312*b* of the chair. In some aspects, the electronic device 200 places the representation 312*c* of the ottoman near the representation 312*b* of the chair based on the types of objects of the chair and ottoman and/or because the chair and ottoman are in a matching set. In some situations, the chair and the ottoman are provided by different sources and the electronic device 200 identifies their types and/or how they should be arranged relative to each other based on metadata provided by the respective sources. In other situations, the chair and the ottoman are provided by the same source. In some aspects, the electronic device 200 places the representation 312*c* of the ottoman near the representation 312*b* of the chair using scene understanding and/or machine learning techniques.

In some aspects, when placing one or more additional objects in the XR environment 301, the electronic device 200 updates the position and/or orientation of one or more virtual objects already in the XR environment 301. For example, instead of placing the representation 312*c* of the ottoman without updating the positions and/or orientations of the representation 312*a* of the lamp and/or the representation 312*b* of the chair as shown in FIG. 3I, the electronic device 200 updates the position and/or orientation of the representation 312*a* of the lamp and/or the representation 312*b* of the chair.

Thus, FIG. 3I illustrates an example of the electronic device 200 displaying representations 312*a* through 312*c* of virtual objects in the XR environment 301, including representations 312*a* through 312*b* of virtual objects brought into the XR environment 301 from a messaging user interface and a representation 312*c* of an object brought into the XR environment 301 from a web browsing user interface 320.

Figure 3J:
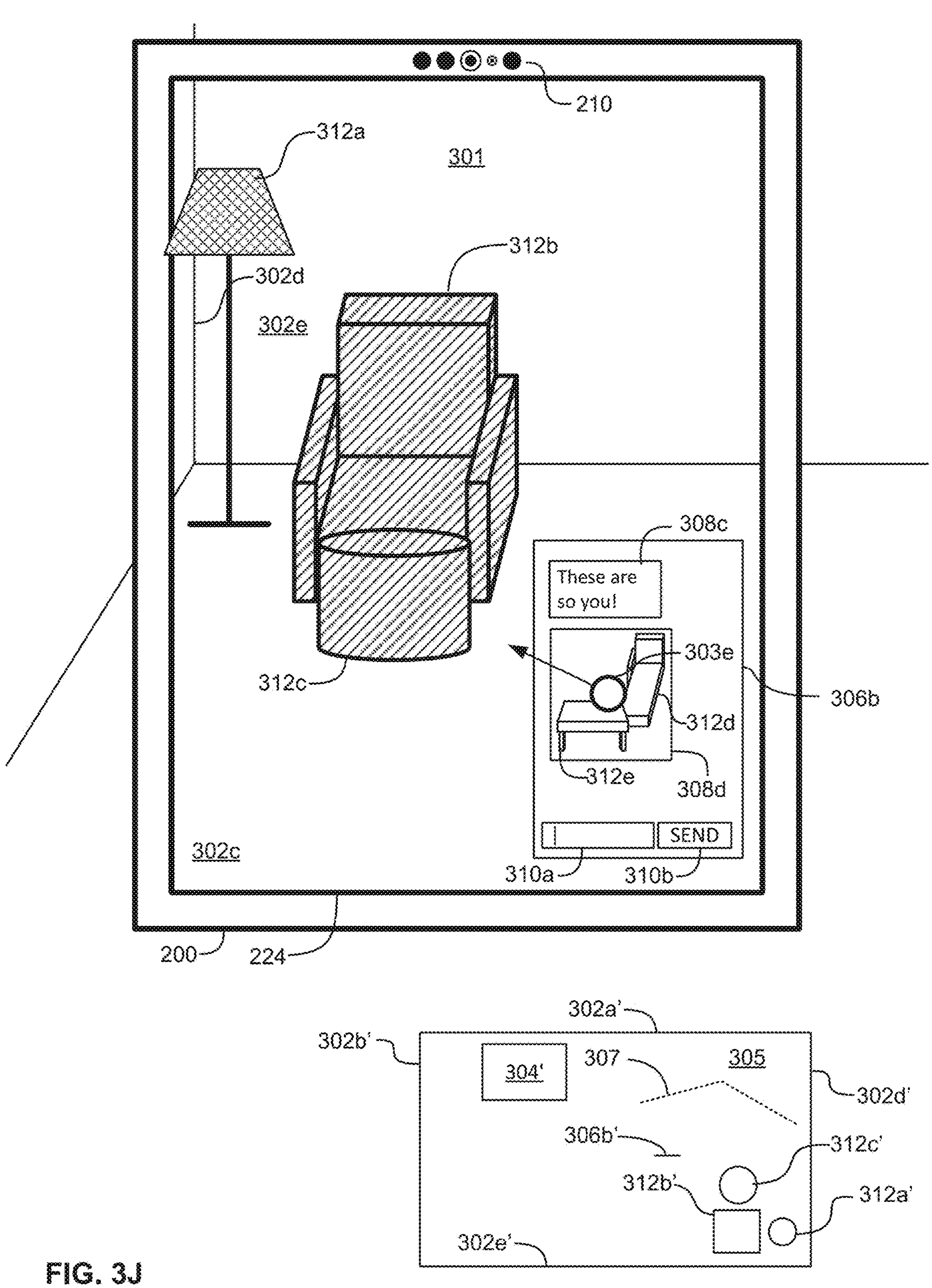

FIG. 3J illustrates the electronic device 200 receiving an input 303*e* dragging representations 312*d* and 312*e* of virtual objects from a messaging user interface 306*b* into the XR environment 301. For example, the messaging user interface 306*b* includes a different conversation from the messaging user interface 306*a* in FIGS. 3A-3G. In some aspects, the messaging user interface 306*b* in FIG. 3J includes representations 308*c* and 308*d* of messages received from another electronic device 200, a text entry field 310*a*, and a send option 310*b*.

In some aspects, the input 303*e* in FIG. 3J is similar to inputs 303*a*, 303*b*, and 303*d* in FIGS. 3A-3B, 3D, and 3H, respectively. In response to the input 303*e* in FIG. 3J, the electronic device 200 displays the representation 312*d* of the chaise and the representation 312*e* of the ottoman in the XR environment 301 in an automatically selected arrangement, as shown in FIG. 3K.

Figure 3K:
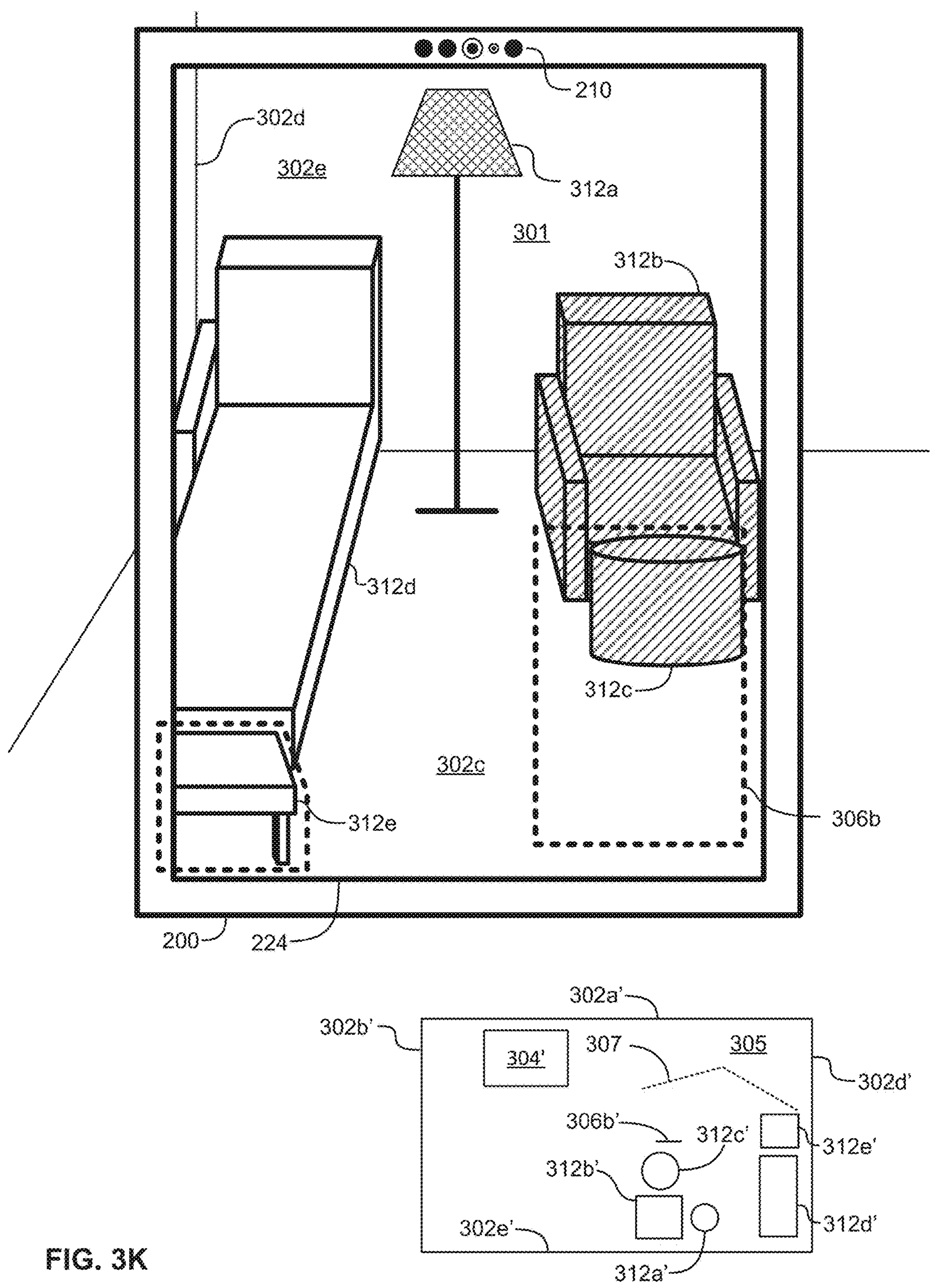

FIG. 3K illustrates an example of the electronic device 200 displaying the representation 312*d* of the chaise and the representation 312*e* of the ottoman in the XR environment 301. As shown in FIG. 3K, the electronic device 200 re-arranges the representation 312*a* of the lamp, the representation 312*b* of the chair, and the representation 312*c* of the ottoman in the XR environment 301 in response to adding the representation 312*d* of the chaise and the representation 312*e* of the ottoman to the XR environment. For example, the electronic device 200 moves the representation 312*a* of the lamp, the representation 312*b* of the chair 312*b*, and the representation 312*c* of the ottoman away from wall 302*d* to display the representation 312*d* of the chaise and the representation 312*e* of the ottoman next to the wall 302*d* with the representation 312*a* of the lamp between the representation 312*d* of the chaise and the representation 312*d* of the chair. In FIG. 3K, the messaging user interface 306*b* is shown as an outline so as not to obscure the representation 312*c* of the ottoman, but it should be understood that, in some aspects, the electronic device 200 continues to display the messaging user interface 306*b* as shown in FIG. 3J concurrently with the other objects shown in FIG. 3K.

In some aspects, the electronic device 200 may remove the presentation of objects to the XR environment 301 in response to one or more inputs (e.g., swiping gesture or selection of one or more affordances). In some aspects, the electronic device 200 may remove the presentation of objects to the XR environment 301 in response to the user exiting out of an application that the object originated from (e.g., messaging user interface 306*a*, web browsing user interface 320). In some aspects, the electronic device 200 may remove the presentation of objects to the XR environment 301 in response to the user exiting out of an application (e.g., object placement application) that is presenting the objects in the XR environment 201.

In some aspects, in response to an input to add objects to the XR environment 301 in addition to one or more other objects already in the XR environment 301, the electronic device 200 forgoes displaying one or more of the objects. For example, the electronic device 200 could forgo displaying the representation 312*e* of the ottoman because the XR environment 301 already includes the representation 312*c* of ottoman and the ottoman corresponding to representation 312*c* matches the chair corresponding to representation 312*b* but the ottoman corresponding to representation 312*e* does not match other objects in the XR environment 301.

Thus, aspects of the disclosure are directed to various techniques of displaying representations of virtual objects in XR environments with automatic placement and orientation based on characteristics of the XR environment and/or the virtual objects.

Figure 4:
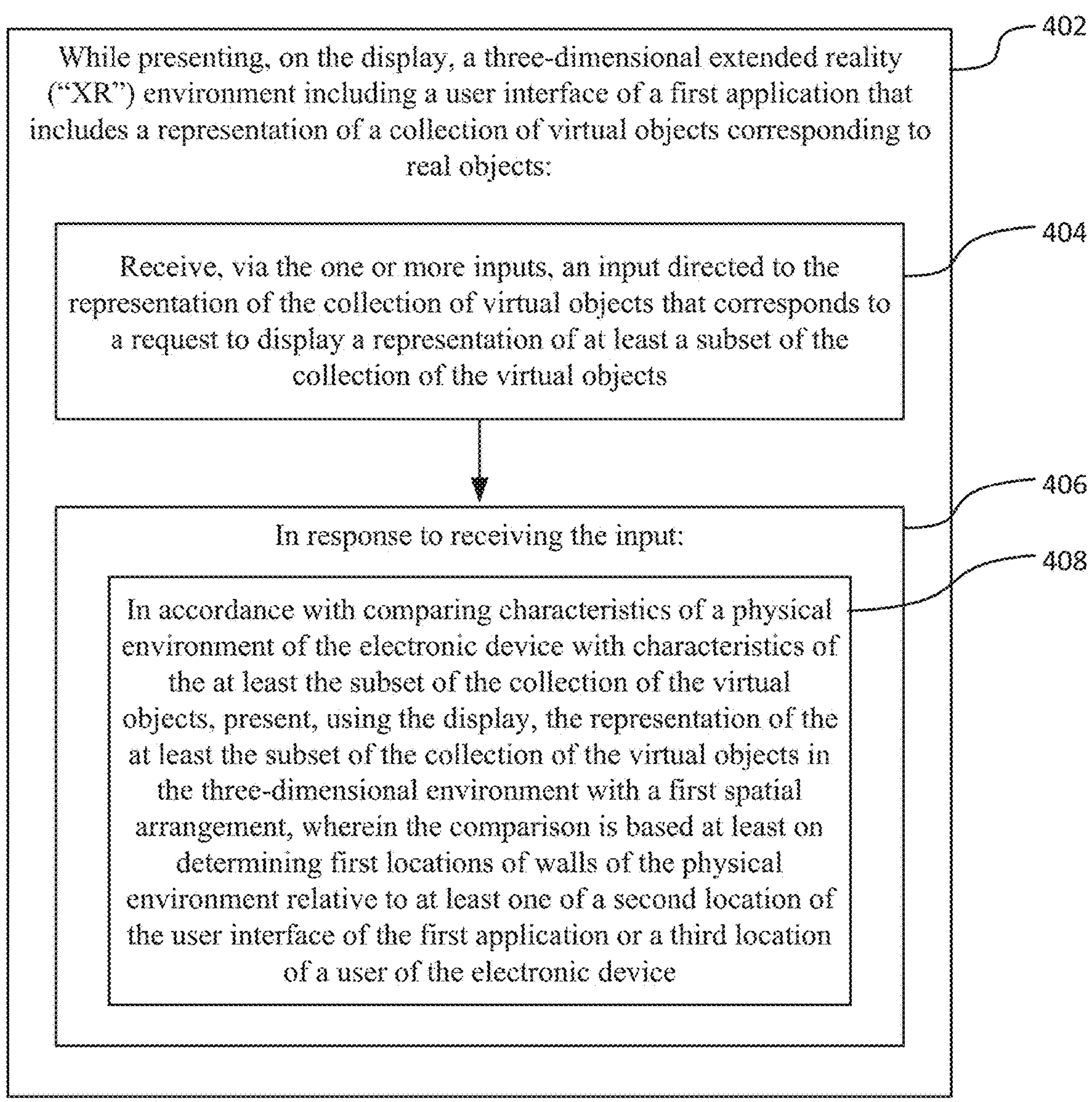
FIG. 4 illustrates an exemplary method for displaying virtual objects in an XR environment according to some aspects of the disclosure.

FIG. 4 illustrates an exemplary method 400 for displaying virtual objects in an XR environment according to some aspects of the disclosure. In some aspects, method 400 is performed by electronic device 200 described above.

In some aspects, method 400 is performed while the electronic device 200 presents, on the display, a three-dimensional extended reality ("XR") environment including a user interface of a first application that includes a representation of a collection of virtual objects corresponding to real objects. In some aspects, the electronic device 200 receives 404, via the one or more inputs, an input directed to the representation of the collection of virtual objects that corresponds to a request to display a representation of at least a subset of the collection of the virtual objects. In some aspects, in response to receiving the input 406, in accordance with comparing characteristics of a physical environment of the electronic device with characteristics of the at least the subset of the collection of the virtual objects, the electronic device 200 presents 408, using the display, the representation of the at least the subset of the collection of the virtual objects in the three-dimensional environment with a first spatial arrangement, wherein the comparison is based at least on determining first locations of walls of the physical environment relative to at least one of a second location of the user interface of the first application or a third location of a user of the electronic device.

Some aspects of the disclosure relate to a method comprising: at an electronic device coupled to a display and one or more inputs: while presenting, on the display, a three-dimensional extended reality ("XR") environment including a user interface of a first application that includes a representation of a collection of virtual objects corresponding to real objects: receiving, via the one or more inputs, an input directed to the representation of the collection of virtual objects that corresponds to a request to display a representation of at least a subset of the collection of the virtual objects; and in response to receiving the input: in accordance with comparing characteristics of a physical environment of the electronic device with characteristics of the at least the subset of the collection of the virtual objects, presenting, using the display, the representation of the at least the subset of the collection of the virtual objects in the three-dimensional environment with a first spatial arrangement, wherein the comparison is based at least on determining first locations of walls of the physical environment relative to at least one of a second location of the user interface of the first application or a third location of a user of the electronic device. Additionally or alternatively, in some aspects, the determining the first location of the walls of the physical environment further comprises determining proximity of the user interface of the first application to a first pair of walls included in the three-dimensional environment. Additionally or alternatively, in some aspects, the determining the first location of the walls of the physical environment comprises determining whether a first pair of walls are closer to the user interface than a second pair of walls are to the user interface. Additionally or alternatively, in some aspects, the determining the first location of the walls of the physical environment comprises determining relative proximity between a first pair of walls and a second pair of walls relative to the third location of the user. Additionally or alternatively, in some aspects, the walls are selected based on size, shape, and/or adjacency. Additionally or alternatively, in some aspects, the collection of virtual objects includes a first virtual object associated with a first application and a second virtual object associated with a second application different from the first application. Additionally or alternatively, in some aspects, the method includes while displaying, using the display device, a user interface of the first application: receiving an input corresponding to a request to save the first object to a new collection; and in response to the input corresponding to the request to save the first object to the collection, saving the first object to the new collection. Additionally or alternatively, in some aspects, prior to receiving the request to display a representation of at least a subset of the collection of the virtual objects, receiving, via the one or more inputs, an input to switch to an object placement mode or launch an object placement application. Additionally or alternatively, in some aspects, the electronic device presents a second representation of a second subset of virtual objects automatically using machine learning. Additionally or alternatively, in some aspects, presenting the second representation of the second subset of the virtual objects automatically comprises selecting the second subset of the virtual objects based on the characteristics of the physical environment of the electronic device and the characteristics of the at least the subset of the collection of the virtual objects. Additionally or alternatively, in some aspects, the method includes displaying a representation of a first object of the at least the subset of the collection of the virtual objects and a representation of a second object of the at least the subset of the collection of the virtual objects in the three-dimensional environment, wherein the representation of the first object is stacked on the representation of the second object in a respective spatial relationship; receiving, via the one or more inputs, a second input; and in response to receiving the second input: in accordance with a determination that the second input is directed to the representation of the second object and corresponds to a request to reposition the representation of second object in the three-dimensional environment, repositioning the representation of the second object and the representation of the first object in the three-dimensional environment in accordance with the second input, including maintaining the respective spatial relationship between the representation of the first object and the representation of the second object. Additionally or alternatively, in some aspects, a representation of a first object of the at least the subset of the collection of the virtual objects includes a product description of the first object, ratings and reviews of the first object, and a selectable option that, when selected causes the electronic device to initiate a process to purchase the first object. Additionally or alternatively, in some aspects, a representation of a first object of the at least the subset of the collection of the virtual objects includes metadata indicating relationships between the first object and other objects of the at least the subset of the collection of the virtual objects. Additionally or alternatively, in some aspects, the method includes while displaying the representation of the at least the subset of the collection of the virtual objects in the three-dimensional environment, receiving, via the one or more input, a third input corresponding to a request to display a representation of a new object in the three-dimensional environment; and in response to receiving the third input, displaying the representation of the new object in the three-dimensional environment closer to a representation of an object of the at least the subset of the collection of the virtual objects as compared to remaining objects of the at least the subset of the collection of the virtual objects based on metadata of the object indicating that the object is associated with the new object. Additionally or alternatively, in some aspects, the method includes while displaying the representation of at least the subset of the collection of the virtual objects in the three-dimensional environment: receiving, via the one or more inputs, a second input corresponding to a request to display a second collection of virtual objects in the three-dimensional environment; and in response to receiving the second input: determining that there are no conflicts between the subset of the collection of the virtual objects and the second collection, presenting, using the display, the representation of the subset of the collection of the virtual objects and the representations of the second collection of the virtual objects in the three-dimensional environment with a third spatial arrangement. Additionally or alternatively, in some aspects, presenting the representation of the subset of the collection of the virtual objects and the representations of the second collection of the virtual objects includes updating a position within the three-dimensional environment of at least one object of the subset of the collection of the virtual objects. Additionally or alternatively, in some aspects, the method includes while displaying the representation of at least the subset of the collection of the virtual objects in the three-dimensional environment, receiving, via the one or more inputs, a second input corresponding to a request to display a second collection of virtual objects in the three-dimensional environment; determining that a respective object of the second collection of the virtual objects has a same type as an object of the at least the subset of the collection of the virtual objects; and presenting, using the display, only one of the respective object or the object of the at least the subset of the collection of the virtual objects based on a set of criteria. Additionally or alternatively, in some aspects, the method includes while displaying the representation of the at least the subset of the collection of the virtual objects in the three-dimensional environment in response to receiving the input: receiving, using the one or more inputs, an input directed to a representation of a respective object included in the collection of virtual objects; and in response to receiving the input directed to the representation of the respective object: in accordance with a determination that a first portion of the respective object is adjustable, adjusting the representation of the respective object to adjust a representation of the first portion of the respective object in accordance with the input directed to the representation of the respective object without adjusting a representation of a second portion of the respective object. Additionally or alternatively, in some aspects, the input includes movement from a location of the representation of the collection of virtual objects to a drop location in the three-dimensional environment; and displaying the representation of an object of the at least the subset of the collection of the virtual objects in a location of the three-dimensional environment independent from the drop location.

Some aspects are directed to an electronic device, comprising: memory; and one or more processors coupled to the memory, a display, and one or more inputs, the one or more processors configured to execute a method comprising: while presenting, on the display, a three-dimensional extended reality ("XR") environment including a user interface of a first application that includes a representation of a collection of virtual objects corresponding to real objects: receiving, via the one or more inputs, an input directed to the representation of the collection of virtual objects that corresponds to a request to display a representation of at least a subset of the collection of the virtual objects; and in response to receiving the input: in accordance with comparing characteristics of a physical environment of the electronic device with characteristics of the at least the subset of the collection of the virtual objects, presenting, using the display, the representation of the at least the subset of the collection of the virtual objects in the three-dimensional environment with a first spatial arrangement, wherein the comparison is based at least on determining first locations of walls of the physical environment relative to at least one of a second location of the user interface of the first application or a third location of a user of the electronic device.

Some aspects are directed to a non-transitory computer readable storage medium storing instructions that, when executed by an electronic device coupled to a display and one or more inputs, causes the electronic device to perform a method comprising: while presenting, on the display, a three-dimensional extended reality ("XR") environment including a user interface of a first application that includes a representation of a collection of virtual objects corresponding to real objects: receiving, via the one or more inputs, an input directed to the representation of the collection of virtual objects that corresponds to a request to display a representation of at least a subset of the collection of the virtual objects; and in response to receiving the input: in accordance with comparing characteristics of a physical environment of the electronic device with characteristics of the at least the subset of the collection of the virtual objects, presenting, using the display, the representation of the at least the subset of the collection of the virtual objects in the three-dimensional environment with a first spatial arrangement, wherein the comparison is based at least on determining first locations of walls of the physical environment relative to at least one of a second location of the user interface of the first application or a third location of a user of the electronic device.

The foregoing description, for purpose of explanation, has been described with reference to specific aspects. However, the illustrative discussions above are not intended to be exhaustive or to limit the invention to the precise forms disclosed. Many modifications and variations are possible in view of the above teachings. The aspects were chosen and described in order to best explain the principles of the invention and its practical applications, to thereby enable others skilled in the art to best use the invention and various described aspects with various modifications as are suited to the particular use contemplated.

The invention claimed is:

1. A method comprising:

at an electronic device coupled to a display and one or more inputs:

while presenting, on the display, a three-dimensional environment including a first virtual object corresponding to a first real object and a user interface of a first application that includes a representation of a collection of second virtual objects corresponding to second real objects:

receiving, via the one or more inputs, an input directed to the representation of the collection of second virtual objects that corresponds to a request to display a representation of at least a subset of the collection of the second virtual objects; and in response to receiving the input:

in accordance with comparing characteristics of a physical environment of the electronic device with characteristics of the at least the subset of the collection of the second virtual objects;

presenting, using the display, the representation of the at least the subset of the collection of the second virtual objects in the three-dimensional environment with a first spatial arrangement, wherein the comparison is based at least on determining first locations of walls of the physical environment relative to at least one of a second location of the user interface of the first application or a third location of a user of the electronic device; and repositioning the first virtual object in the three-dimensional environment.

2. The method of claim 1, wherein the determining the first locations of the walls of the physical environment further comprises determining proximity of the user interface of the first application to a first pair of walls included in the three-dimensional environment.

3. The method of claim 1, wherein the determining the first locations of the walls of the physical environment comprises determining whether a first pair of walls are closer to the user interface than a second pair of walls are to the user interface.

4. The method of claim 1, wherein the determining the first locations of the walls of the physical environment comprises determining relative proximity between a first pair of walls and a second pair of walls relative to the third location of the user.

5. The method of claim 1, wherein presenting the representation of the at least the subset of the collection of second virtual objects includes presenting the representation of the at least the subset of the collection of second virtual objects automatically using machine learning.

6. The method of claim 1, further comprising:

displaying a representation of a third object of the at least the subset of the collection of the second virtual objects and a representation of a fourth object of the at least the subset of the collection of the second virtual objects in the three-dimensional environment, wherein the representation of the third object is stacked on the representation of the fourth object in a respective spatial relationship;

receiving, via the one or more inputs, a second input; and in response to receiving the second input:

in accordance with a determination that the second input is directed to the representation of the fourth object and corresponds to a request to reposition the representation of fourth object in the three-dimensional environment, repositioning the representation of the fourth object and the representation of the third object in the three-dimensional environment in accordance with the second input, including maintaining the respective spatial relationship between the representation of the third object and the representation of the fourth object.

7. The method of claim 1, wherein a representation of a third object of the at least the subset of the collection of the second virtual objects includes metadata indicating relationships between the third object and other objects of the at least the subset of the collection of the second virtual objects.

8. The method of claim 1, further comprising:

while displaying the representation of the at least the subset of the collection of the second virtual objects in the three-dimensional environment, receiving, via the one or more inputs, a third input corresponding to a request to display a representation of a new object in the three-dimensional environment; and in response to receiving the third input, displaying the representation of the new object in the three-dimensional environment closer to a representation of an object of the at least the subset of the collection of the second virtual objects as compared to remaining objects of the at least the subset of the collection of the second virtual objects based on metadata of the object indicating that the object is associated with the new object.

9. The method of claim 1, further comprising:

while displaying the representation of at least the subset of the collection of the second virtual objects in the three-dimensional environment:

receiving, via the one or more inputs, a second input corresponding to a request to display a collection of third virtual objects in the three-dimensional environment; and in response to receiving the second input:

in accordance with determining that there are no conflicts between the subset of the collection of the second virtual objects and the collection of the third virtual objects, presenting, using the display, the representation of the subset of the collection of the second virtual objects and representations of the collection of the third virtual objects in the three-dimensional environment with a third spatial arrangement.

10. The method of claim 1, further comprising:

while displaying the representation of at least the subset of the collection of the second virtual objects in the three-dimensional environment, receiving, via the one or more inputs, a second input corresponding to a request to display a collection of third virtual objects in the three-dimensional environment;

determining that a respective object of the collection of the third virtual objects has a same type as an object of the at least the subset of the collection of the second virtual objects; and in accordance with determining that the respective object of the collection of the third virtual objects has the same type as the object of at least the subset of the collection of the second virtual objects, presenting, using the display, only one of the respective object of the collection of the third virtual objects or the object of the at least the subset of the collection of the second virtual objects based on a set of criteria.

11. The method of claim 1, further comprising:

while displaying the representation of at least the subset of the collection of the second virtual objects in the three-dimensional environment in response to receiving the input:

receiving, using the one or more inputs, an input directed to a representation of a respective object included in the collection of the second virtual objects; and in response to receiving the input directed to the representation of the respective object:

in accordance with a determination that a first portion of the respective object is adjustable, adjusting the representation of the respective object to adjust a representation of the first portion of the respective object in accordance with the input directed to the representation of the respective object without adjusting a representation of a second portion of the respective object.

12. An electronic device, comprising:

memory; and one or more processors coupled to the memory, a display, and one or more inputs, the one or more processors configured to execute a method comprising:

while presenting, on the display, a three-dimensional environment including a user interface of a first application that includes a representation of a collection of virtual objects corresponding to real objects:

receiving, via the one or more inputs, an input directed to the representation of the collection of virtual objects that corresponds to a request to display a representation of at least a subset of the collection of the virtual objects; and in response to receiving the input:

in accordance with comparing characteristics of a physical environment of the electronic device with characteristics of the at least the subset of the collection of the virtual objects, presenting, using the display, the representation of the at least the subset of the collection of the virtual objects in the three-dimensional environment with a first spatial arrangement that includes proximity of the subset of the collection of virtual objects to the user interface of the first application.

13. The electronic device of claim 12, wherein the method further comprises:

while displaying the representation of the at least the subset of the collection of the virtual objects in the three-dimensional environment, receiving, via the one or more inputs, a third input corresponding to a request to display a representation of a new object in the three-dimensional environment; and in response to receiving the third input, displaying the representation of the new object in the three-dimensional environment closer to a representation of an object of the at least the subset of the collection of the virtual objects as compared to remaining objects of the at least the subset of the collection of the virtual objects based on metadata of the object indicating that the object is associated with the new object.

14. The electronic device of claim 12, wherein the method further comprises:

while displaying the representation of at least the subset of the collection of the virtual objects in the three-dimensional environment, receiving, via the one or more inputs, a second input corresponding to a request to display a second collection of virtual objects in the three-dimensional environment;

determining that a respective object of the second collection of the virtual objects has a same type as an object of the at least the subset of the collection of the virtual objects; and in accordance with determining that the respective object of the second collection has the same type as the object of at least the subset of the collection of the virtual objects, presenting, using the display, only one of the respective object or the object of the at least the subset of the collection of the virtual objects based on a set of criteria.

15. The electronic device of claim 12, wherein the method further comprises:

while displaying the representation of at least the subset of the collection of the virtual objects in the three-dimensional environment in response to receiving the input:

receiving, using the one or more inputs, an input directed to a representation of a respective object included in the collection of virtual objects; and in response to receiving the input directed to the representation of the respective object:

in accordance with a determination that a first portion of the respective object is adjustable, adjusting the representation of the respective object to adjust a representation of the first portion of the respective object in accordance with the input directed to the representation of the respective object without adjusting a representation of a second portion of the respective object.

16. A non-transitory computer readable storage medium storing instructions that, when executed by an electronic device coupled to a display and one or more inputs, causes the electronic device to perform a method comprising:

while presenting, on the display, a three-dimensional environment including a user interface of a first application that includes a representation of a collection of virtual objects corresponding to real objects:

receiving, via the one or more inputs, an input directed to the representation of the collection of virtual objects that corresponds to a request to display a representation of at least a subset of the collection of the virtual objects; and in response to receiving the input:

in accordance with comparing characteristics of a physical environment of the electronic device with characteristics of the at least the subset of the collection of the virtual objects, presenting, using the display, the representation of the at least the subset of the collection of the virtual objects in the three-dimensional environment with a first spatial arrangement that includes proximity of the subset of the collection of virtual objects to the user interface of the first application, wherein the comparison is based at least on determining first locations of walls of the physical environment relative to at least one of a second location of the user interface of the first application or a third location of a user of the electronic device.

17. The non-transitory computer readable storage medium of claim 16, wherein the method further comprises:

while displaying the representation of the at least the subset of the collection of the virtual objects in the three-dimensional environment, receiving, via the one or more inputs, a third input corresponding to a request to display a representation of a new object in the three-dimensional environment; and in response to receiving the third input, displaying the representation of the new object in the three-dimensional environment closer to a representation of an object of the at least the subset of the collection of the virtual objects as compared to remaining objects of the at least the subset of the collection of the virtual objects based on metadata of the object indicating that the object is associated with the new object.

18. The non-transitory computer readable storage medium of claim 16, wherein the method further comprises:

while displaying the representation of at least the subset of the collection of the virtual objects in the three-dimensional environment, receiving, via the one or more inputs, a second input corresponding to a request to display a second collection of virtual objects in the three-dimensional environment;

determining that a respective object of the second collection of the virtual objects has a same type as an object of the at least the subset of the collection of the virtual objects; and in accordance with determining that the respective object of the second collection has the same type as the object of at least the subset of the collection of the virtual objects, presenting, using the display, only one of the respective object or the object of the at least the subset of the collection of the virtual objects based on a set of criteria.

19. The non-transitory computer readable storage medium of claim 16, wherein the method further comprises:

while displaying the representation of at least the subset of the collection of the virtual objects in the three-dimensional environment in response to receiving the input:

receiving, using the one or more inputs, an input directed to a representation of a respective object included in the collection of virtual objects; and in response to receiving the input directed to the representation of the respective object:

in accordance with a determination that a first portion of the respective object is adjustable, adjusting the representation of the respective object to adjust a representation of the first portion of the respective object in accordance with the input directed to the representation of the respective object without adjusting a representation of a second portion of the respective object.

* * * * *